United States Patent [19]
Hisatomi

[11] Patent Number: 5,528,442
[45] Date of Patent: Jun. 18, 1996

[54] DISK PLAYER WITH MAGAZINE SWITCHED DRIVE SOURCE

[75] Inventor: Yuichiro Hisatomi, Tokyo, Japan

[73] Assignee: Nakamichi Corporation, Tokyo, Japan

[21] Appl. No.: 205,019

[22] Filed: Mar. 1, 1994

[30] Foreign Application Priority Data

Mar. 5, 1993 [JP] Japan .................................. 5-071177

[51] Int. Cl.$^6$ ......................... G11B 17/22; G11B 17/04
[52] U.S. Cl. ........................ 369/191; 369/38; 369/75.2
[58] Field of Search ................................ 369/34, 36, 38, 369/178, 191–194, 75.2, 77.1, 77.2

[56] References Cited

U.S. PATENT DOCUMENTS

| | | | |
|---|---|---|---|
| 4,561,078 | 12/1985 | Nakayama | 369/38 |
| 4,567,584 | 1/1986 | Kawakami | 369/38 |
| 4,653,037 | 3/1987 | Nakayama et al. | 369/38 |
| 4,796,244 | 1/1989 | Tsuruta et al. | 369/38 |
| 4,797,865 | 1/1989 | Imai et al. | 369/39 |
| 4,811,318 | 3/1989 | Laufer | 369/36 |
| 4,841,499 | 6/1989 | Takahashi et al. | 369/38 |
| 4,878,137 | 10/1989 | Yamashita et al. | 360/98.05 |
| 4,969,138 | 11/1990 | Ikedo et al. | 369/36 |
| 4,993,008 | 2/1991 | Shiba | 369/3 |
| 5,025,338 | 6/1991 | Sone et al. | 360/99.06 |
| 5,062,092 | 10/1991 | Siryj et al. | 369/38 |
| 5,123,001 | 6/1992 | Nakamichi et al. | 369/36 |
| 5,128,918 | 7/1992 | Suzuki et al. | 369/77.1 |
| 5,161,138 | 11/1992 | Caspers | 369/36 |
| 5,172,361 | 12/1992 | Urushibata et al. | 369/77.1 |
| 5,218,593 | 6/1993 | Kaneo et al. | 369/77.1 |

FOREIGN PATENT DOCUMENTS

| | | |
|---|---|---|
| 0284815 | 3/1988 | European Pat. Off. . |
| 62-47893 | 3/1987 | Japan . |
| 62-83254 | 5/1987 | Japan . |
| 63-29258 | 2/1988 | Japan . |
| 63-79273 | 4/1988 | Japan . |
| 63-200354 | 8/1988 | Japan . |
| 63-130950 | 8/1988 | Japan . |
| 63-293756 | 11/1988 | Japan . |
| 1-66862 | 3/1989 | Japan .................................. 369/178 |
| 1-71338 | 5/1989 | Japan . |
| 1-199358 | 8/1989 | Japan . |
| 1-50023 | 10/1989 | Japan . |
| 1-56459 | 11/1989 | Japan . |
| 2-6542 | 2/1990 | Japan . |
| 2-6151 | 2/1990 | Japan . |
| 2-143942 | 6/1990 | Japan . |
| 2-260274 | 10/1990 | Japan . |
| 2-44388 | 11/1990 | Japan . |
| 3-16126 | 4/1991 | Japan . |
| 3-201259 | 9/1991 | Japan . |
| 4-114357 | 4/1992 | Japan . |
| 4-24512 | 6/1992 | Japan . |
| 4-62157 | 10/1992 | Japan . |

Primary Examiner—Stuart S. Levy
Assistant Examiner—William J. Klimowicz
Attorney, Agent, or Firm—Christopher R. Pastel; Thomas R. Morrison

[57] ABSTRACT

A disk player has a magazine for storing disks and a disk transport mechanism transporting a selected disk between four positions including an eject position, a load position, a playback position, and a store position which lie in a single plane. The selected disk is carried upon a tray from the eject position to the load position where the selected disk is partially removed from the tray to the playback position above a disk reader. The magazine accepts a plurality of disks. A magazine driving mechanism provides relative movement between the magazine and a plane of transport of the disk transport mechanism permitting a selected disk to be inserted or removed from the magazine at the store position. A disk clamping mechanism moves the disk reader relative to a clamp assembly in order to clamp the selected disk to a turntable. Both the disk clamping mechanism and the magazine driving mechanism are driven from a common drive source. An output of the common drive source is switched by the disk transport mechanism via a planetary gear assembly.

9 Claims, 39 Drawing Sheets

DISK PLAYER WITH MAGAZINE SWITCHED DRIVE SOURCE

BACKGROUND OF THE INVENTION

The present invention relates to an optical disk player having a magazine for storing disks which permits the playing of a selected disk from the magazine, and more particularly, to a disk player having a disk reader with a drive mechanism for clamping the selected disk and a magazine with an alignment mechanism where both the mechanisms are driven by a common motor.

Disk players having magazines for storing disks typically provide a selecting apparatus for transporting a selected disk from the magazine to a disk reader or an ejection position. One such disk player is disclosed in U.S. Pat. No. 5,123,001. The disclosed disk player provides trays for holding disks which are transported between ejection, playback, and storage positions, wherein the storage position has a selected disk positioned within the magazine. The disks are arranged concentrically within the magazine and the magazine is driven by a vertical drive mechanism in a first direction perpendicular to the disks and relative to a disk reader. Disks are transported by a disk transport mechanism in a straight line in a second direction perpendicular to the first direction. Disks in the playback position are completely removed from the magazine and are lowered onto a turntable by a disk clamping mechanism.

While the above design provides for effective operation, dedicated driving motors are required for both the vertical drive mechanism for the magazine and the disk clamping mechanism. This type of design having a dedicated drive source for each function increases the cost of components and manufacture. Furthermore, the number of parts associated with dedicated drive sources makes it difficult to reduce a size of the disk player. Thus, eliminating drive sources by driving more than one mechanism from a common drive source would provide numerous advantages.

OBJECTS AND SUMMARY OF THE INVENTION

Accordingly, it is an object of the invention to provide a disk player which overcomes the drawbacks of the prior art.

It is a further object of the invention to provide a disk player, with a magazine driving mechanism and a disk clamp driving mechanism driven by a common drive source.

It is a still further object of the invention to provide a disk player with a planetary gear assembly for applying an output of a common drive source to either a disk clamp driving mechanism or a magazine driving mechanism.

It is yet another object of the invention to provide a disk player with a common drive source for a magazine driving mechanism and a clamp driving mechanism wherein a braking mechanism is actuated by a disk transport mechanism to select an output from a planetary gear assembly driven by the common source.

It is also an object of the present invention to provide a magazine in a disk player wherein disks are held on trays stack upon each other where a separator mechanism displaces apart the trays and switches the output of a common drive source between a disk clamp driving mechanism and a magazine driving mechanism.

Briefly stated, the present invention provides a disk player having a magazine for storing disks and a disk transport mechanism for transporting a selected disk between four positions including an eject position, a load position, a playback position, and a store position which lie in a single plane. The selected disk is carried upon a tray from the eject position to the load position where the selected disk is partially removed from the tray to the playback position above a disk reader. The magazine accepts a plurality of disks. A magazine driving mechanism provides relative movement between the magazine and a plane of transport of the disk transport mechanism permitting a selected disk to be inserted or removed from the magazine at the store position. A disk clamping mechanism moves the disk reader relative to a clamp assembly in order to clamp the selected disk to a turntable. Both the disk clamping mechanism and the magazine driving mechanism are driven by a common drive source. An output of the common drive source is switched by the disk transport mechanism via a planetary gear assembly. An embodiment of the invention optionally provides for transporting the disks upon carriages accepted in the magazine and a lifter mechanism displacing apart disks in the magazine to allow sufficient clearance for access to a selected disk.

In accordance with these and other objects of the invention, there is provided a disk player for playing a selected disk of a plurality of disks comprising: a disk reader for reading the selected disk, a magazine having a plurality of holding means for holding the plurality of disks, transport means for transporting the selected disk between the disk reader and the magazine, alignment means for aligning a selected holding means with the transport means, driving means for clamping the selected disk on the disk reader permitting the selected disk to be read, a drive motor, and drive switching means, responsive to the transport means, for selectively coupling the drive motor to one of the alignment means and the driving means.

The present invention also provides a disk player capable of playing a selected disk of a plurality of disks comprising: a chassis a disk reader movably mounted in the chassis, a magazine for accepting the plurality of disks which is movably mounted in the chassis, transport means for moving the selected disk between the magazine and the disk reader, aligning means for aligning the magazine with the transport means to permit insertion and withdrawal of the selected disk, a drive source, reader moving means for moving the disk reader between a first position disengaged with the selected disk and a second position engaged with the selected disk, a planetary gear assembly having an input coupled to the drive source, a first output coupled to the aligning means, and a second output coupled to the reader moving means, a braking member, movably mounted in the chassis, coupled to the transport means, and having first and second brake portions for braking the first and second outputs of the planetary gear assembly, and the braking member being responsive to the transport means to permit the first brake portion to brake the first out put of the planetary gear assembly when the transport means is in a first position, and to permit the second portion to brake the second output of the planetary gear assembly when the transport means is in a second position.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
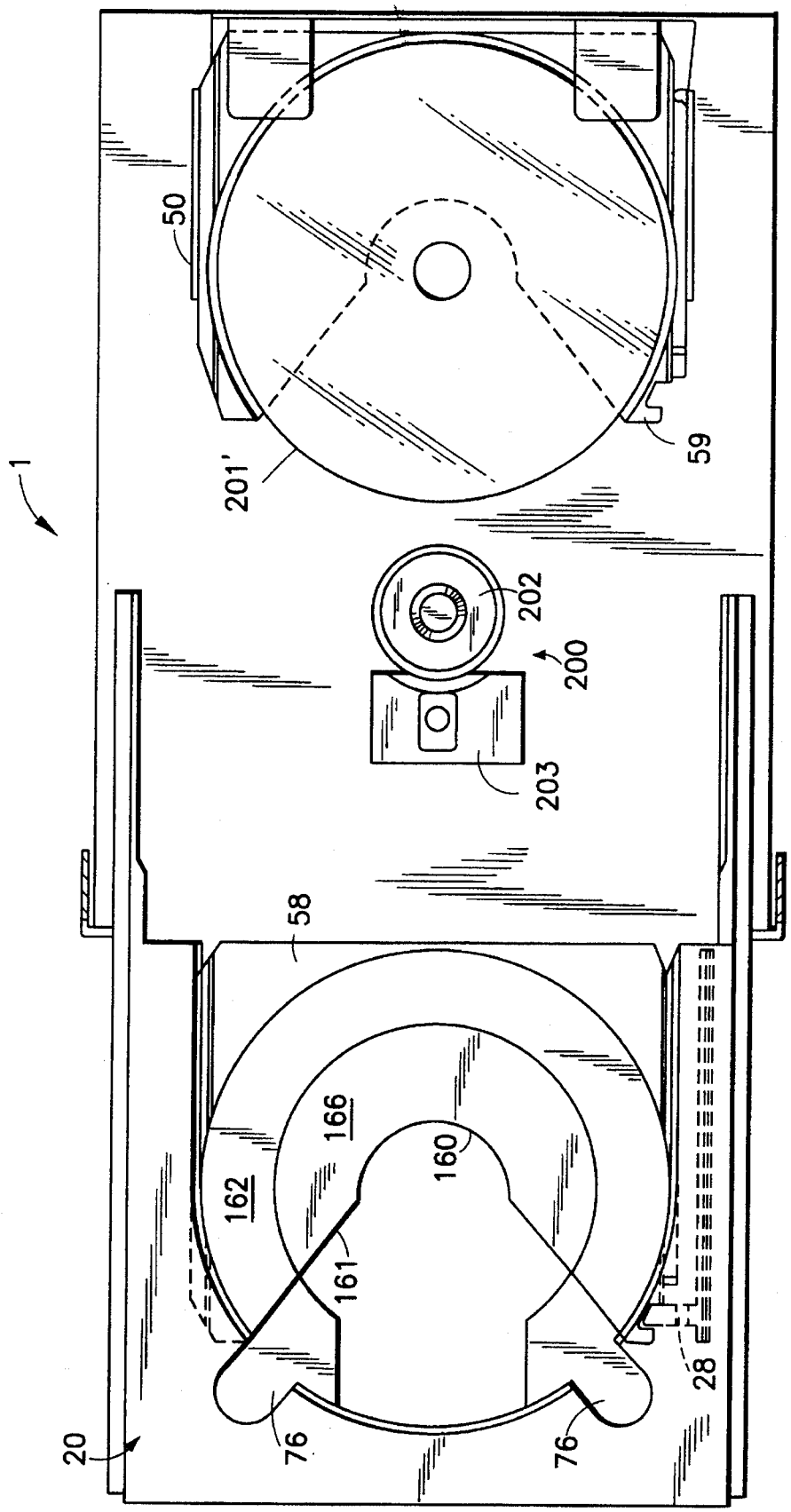
FIG. 1 is a simplified plan view of an embodiment of a disk player of the present invention showing a tray and carriage in an ejection position.

Referring to FIG. 1, an embodiment of a disk player 1 of the present invention is shown having a tray 20 moved to an ejection position outside disk player 1. A magazine 50 has seven storage positions (not shown) for holding a base carriage 58 and six standard carriages 59 (one of which is shown) upon which disks 201' are carried. The base carriage 58 is removed from a base (lowest), or seventh position in the magazine 50 and is held in the tray 20 at the ejection position, extending out from disk player 1, for the acceptance or removal of a disk.

The base carriage 58 has first and second concentric circular recesses, 162 and 166, for the acceptance of 12 cm and 8 cm compact disks respectively. A clearance notch 161 extends inward from the perimeter of base carriage 58, ending in a center arc 160. The base carriage 58 is identical to the standard carriages 59 with the exception that the standard carriages 59 lack the second circular recess 166. For the purpose of illustration, the operation of the disk player 1 is described with the base carriage 58 identified as a selected carriage being operated upon, however, it is understood that the operations apply to all the carriages.

The tray 20 has two flanges 76 which are flush with the first circular recess 162 when the base carriage 58 is held by the tray 20. The flanges 76 provide additional support for a 12 cm disk placed in the base carriage 58. An optical disk reader assembly 200, includes an optical pick-up 203 and a turntable 202, situated in front of the magazine 50.

Figure 2:
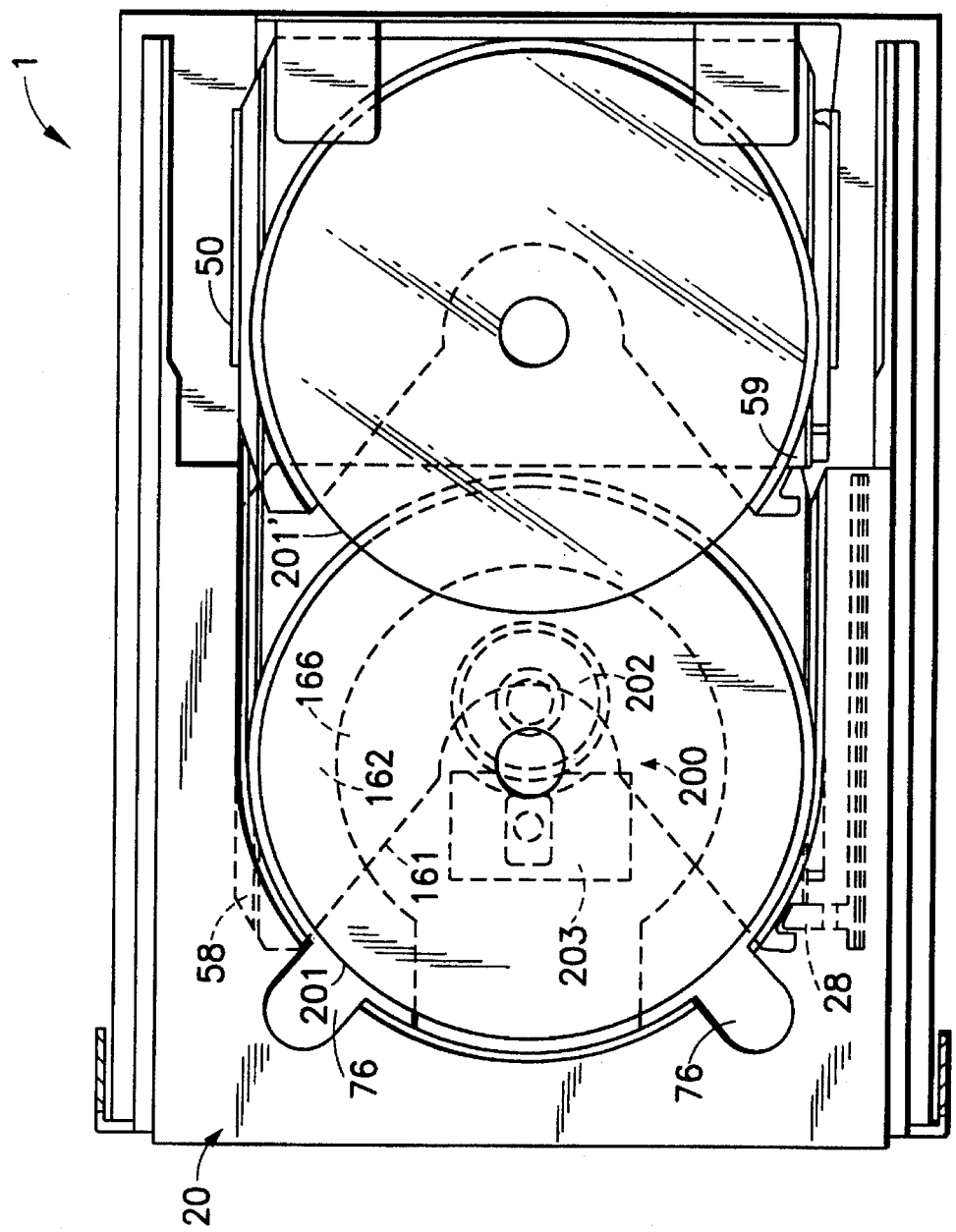
FIG. 2 is a simplified plan view of the embodiment of FIG. 1 showing the tray and carriage in a load position.

Referring to FIG. 2, the tray 20 is shown at a load position. A 12 cm disk 201 is disposed in the base carriage 58 in preparation for loading onto the disk reader assembly 200.

Figure 3:
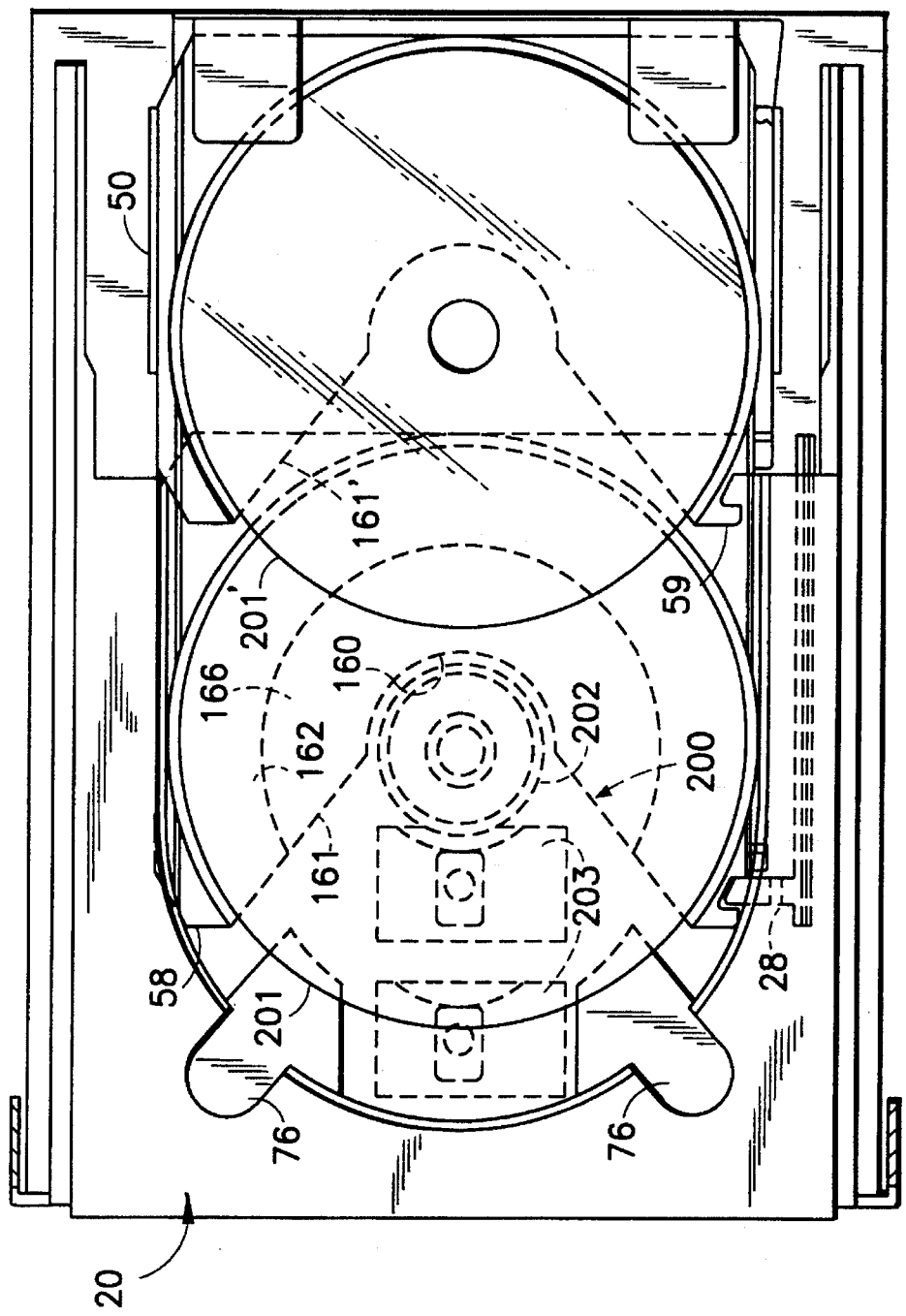
FIG. 3 is a simplified plan view of the embodiment of FIG. 1 showing the tray and carriage in a playback position.

Referring now also to FIG. 3, the base carriage 58 is shown at a playback position where a center of the disk 201 is aligned with the axis of the turntable 202. A shuttle 28, shown in dashed line, engages the base carriage 58. The shuttle 28 is actuated by a transport mechanism (not shown) to move the base carriage 58 from the load position of FIG. 2 to the playback position of FIG. 3. The disk 201 is read by the optical pick-up 203 scanning a recording surface of the disk 201 via the clearance notch 161 as disk 201 is rotated by the turntable 202.

At the playback position in FIG. 3, a portion of the disk 201 overlaps remaining disks 201' stored in the magazine 50. In this position, disk 201 is rotated while it remains partially within the magazine 50. This arrangement permits the disk player 1 to be constructed in a compact manner wherein the disk 201 is displaced a minimum distance from a position concentric with the disks 201'. Placement of the turntable 202 just outside an outer radius of the stored disk 201' and the movement of the optical pick-up 203 parallel to a path of the transport mechanism allows the structure of the disk player 1 to be further reduced in size. The disk 201 is stored in the magazine 50 by the shuttle 28 moving the base carriage 58 into the magazine 50. The overlap feature described is also realizable in an alternate embodiment where the magazine 50 is disposed between the ejection and load positions. Such an embodiment is also considered to be within the scope and spirit of the present invention.

The feature of having both load and playback positions permits a further reduction in the size of the disk player 1. If the disk player 1 of FIG. 3 were to read the disk 201 in the load position, the movement of the optical pick-up 203 would require extension of a carriage beyond the bounds shown in FIG. 3. This extension would be required for clearance of the optical pick-up 203 when reading an outer perimeter of the disk in the load position. A pickup transport mechanism and a body of the pickup would extend out beyond an optical lens of the pickup. Therefore, additional clearance in the base carriage 58 would be necessitated. Thus, the base carriage 58 and tray 20 would be extended. In addition to requiting a larger chassis, such an extension presents an additional problem in that the tray 20 must extend further from the chassis when in the ejection position. Thus, the use of both the load position and the playback position shortens the length of the tray 20 and base carriage 58. The illustrated embodiment incorporates both the features of having the overlapping playback position and the load position, however, embodiments having a single one of either of these features are realizable. Additionally, an embodiment having a load position and no magazine is also realizable and advantageous in that the tray is shortened. Such embodiments are viewed as being within the spirit of the present invention.

Figure 4:
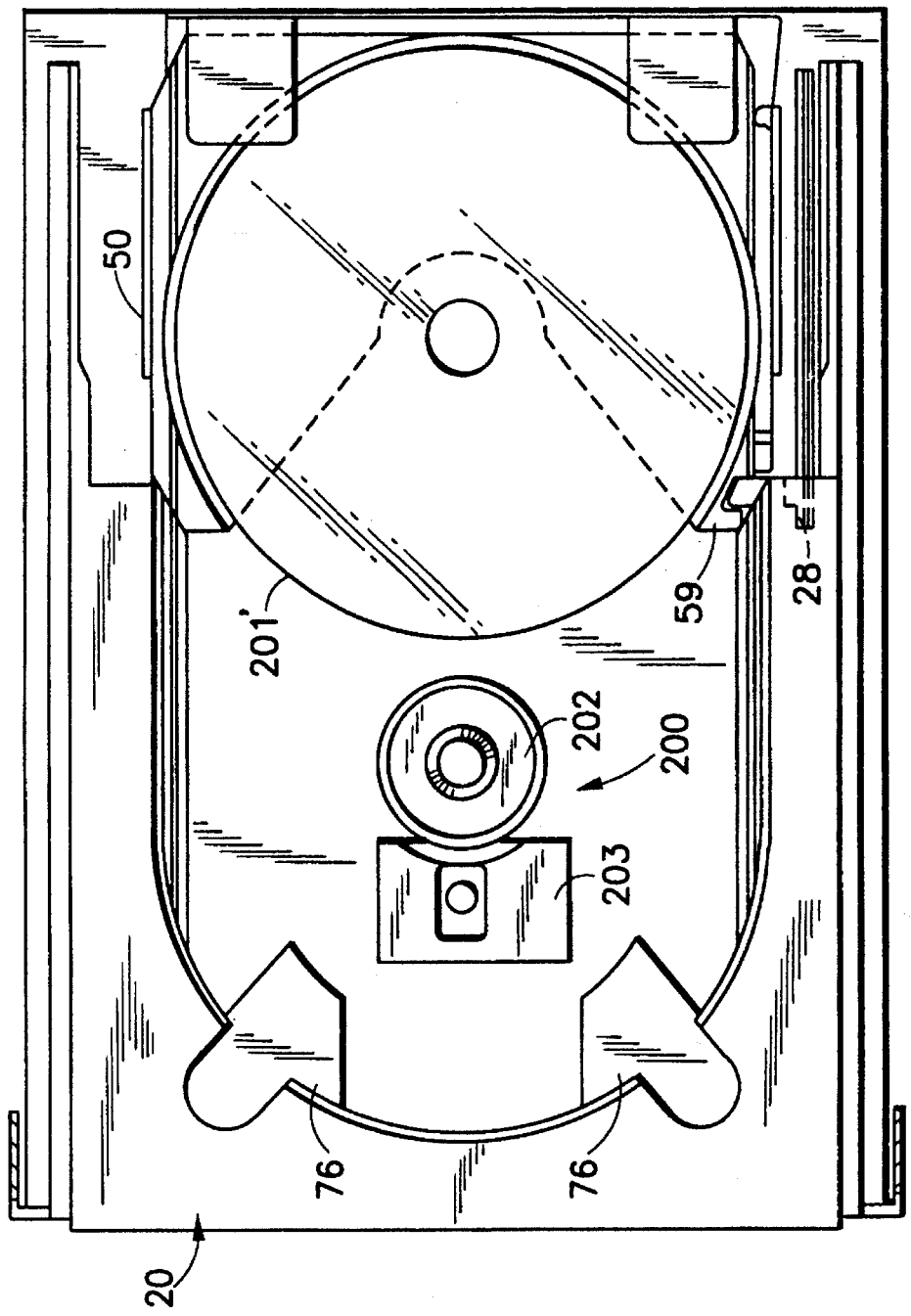
FIG. 4 is a simplified plan view of the embodiment of FIG. 1 showing the tray and carriage in a store position.

Referring to FIG. 4, the disk player 1 is shown with all carriages stored in the magazine 50 wherein the top one of carriages 59 is representative of the positioning of all carriages 58 and 59 in the magazine 50. Once all the standard carriages 59, disks 201', and base carriage 58 are stored in the magazine 50, the magazine 50 is movable in a direction perpendicular to recorded surfaces of the stored disks, 201 and 201', since there is no longer an overlap. Movement of the magazine 50 permits a selected disk therein to be aligned with a plane of the tray 20 for transport to the playback, load, and ejection positions.

Figure 5:
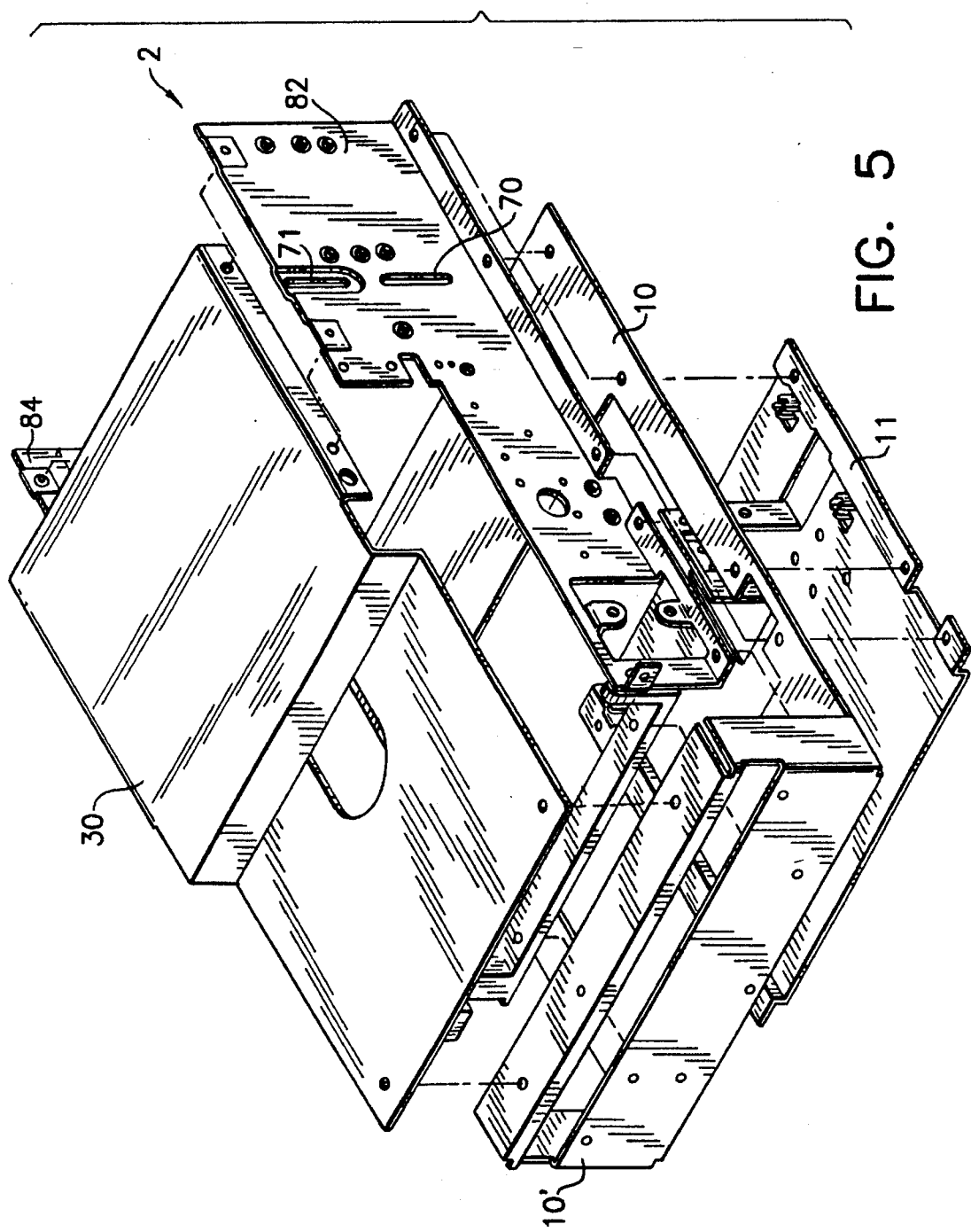
FIG. 5 is an exploded perspective view of a main chassis of the embodiment of the disk player of FIG. 1.

Referring to FIG. 5, a main chassis 2 of the disk player includes a base chassis 10 with a bottom plate 11. Right and left side plates, 82 and 84, respectively, are fixed to bottom plate 11 by screws or other forms of fasteners (not shown). A top plate 30 is similarly fastened to a vertical extension 10' of the base chassis 10 and the right and left side plates, 82 and 84. The right and left side plates, 82 and 84, have vertical guide slots, 70 and 71, which function in conjunction with a magazine transport mechanism described below.

Figure 6:
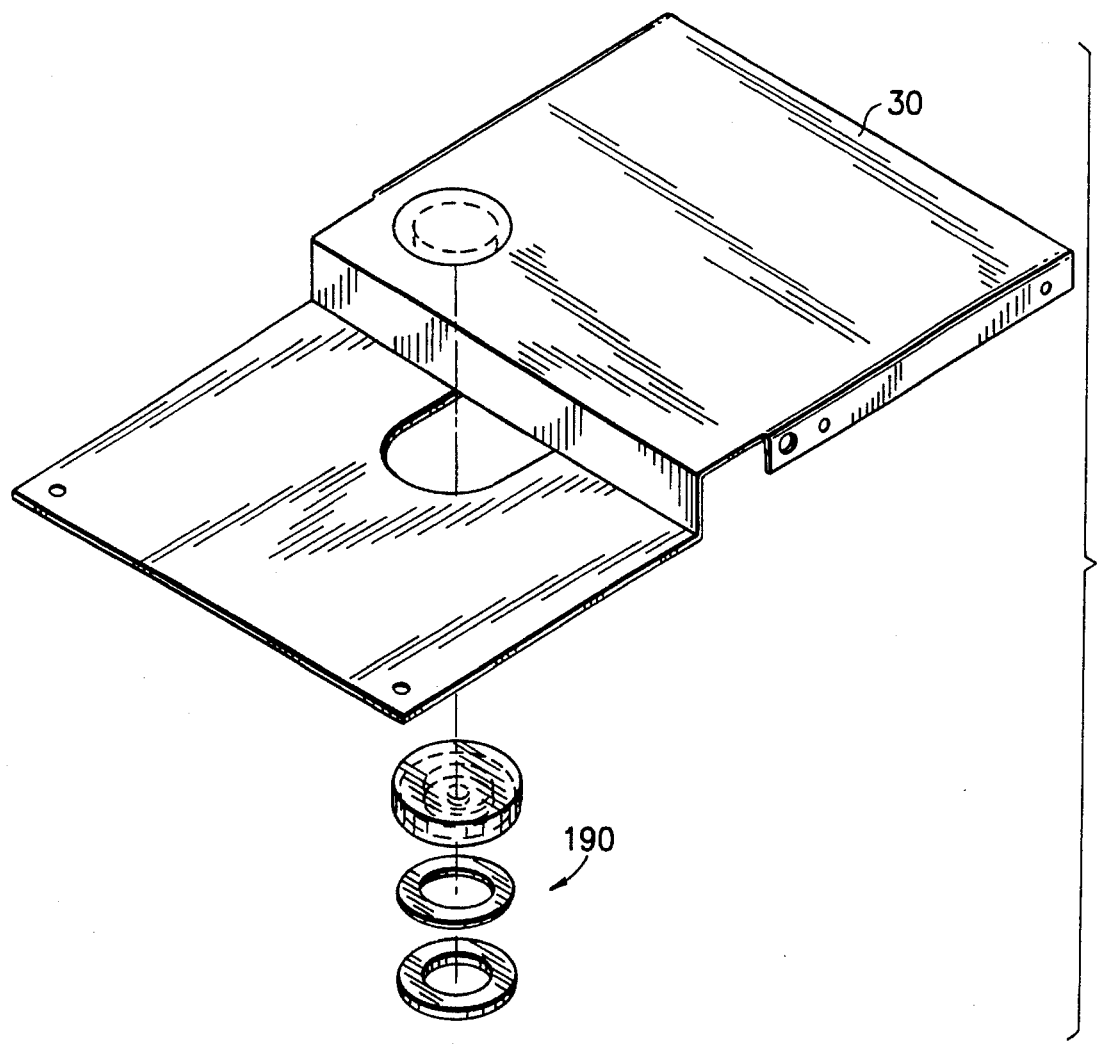
FIG. 6 is an exploded perspective view of a clamping mechanism and a top plate of the main chassis of FIG. 5.

Referring now also to FIG. 6, the top plate 30 incorporates a clamp assembly 190 which clamps the disks to the turntable 202.

Figure 7:
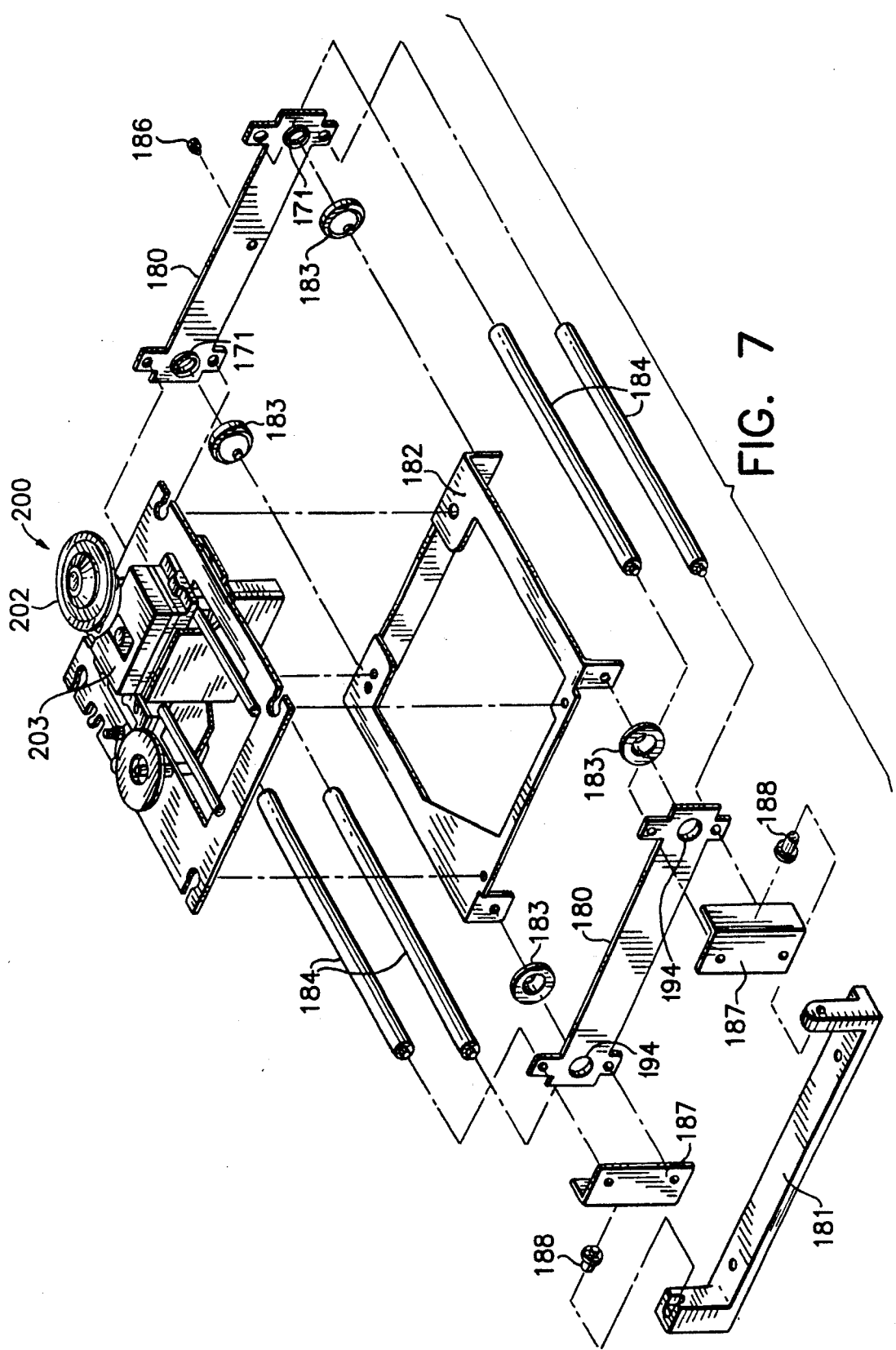
FIG. 7 is an exploded perspective view of a disk reader assembly of the embodiment of the disk player of FIG. 1.

Referring to FIG. 7, an exploded view of the disk reader assembly 200 shows the optical pick-up 203 and turntable 202 which attach to a mounting frame 182. The mounting frame 182 is flexibly supported by rubber dampers 183 within a support frame comprised of rods 184 and a pair of end plates 180. Corner brackets 187 are attached to the support frame and have pivot pins 188 which engage a pivot bracket 181. The support frame is pivoted to clamp a disk between the turntable 202 and the clamp assembly 190 of the top plate 30 shown in FIG. 6.

Figure 8:
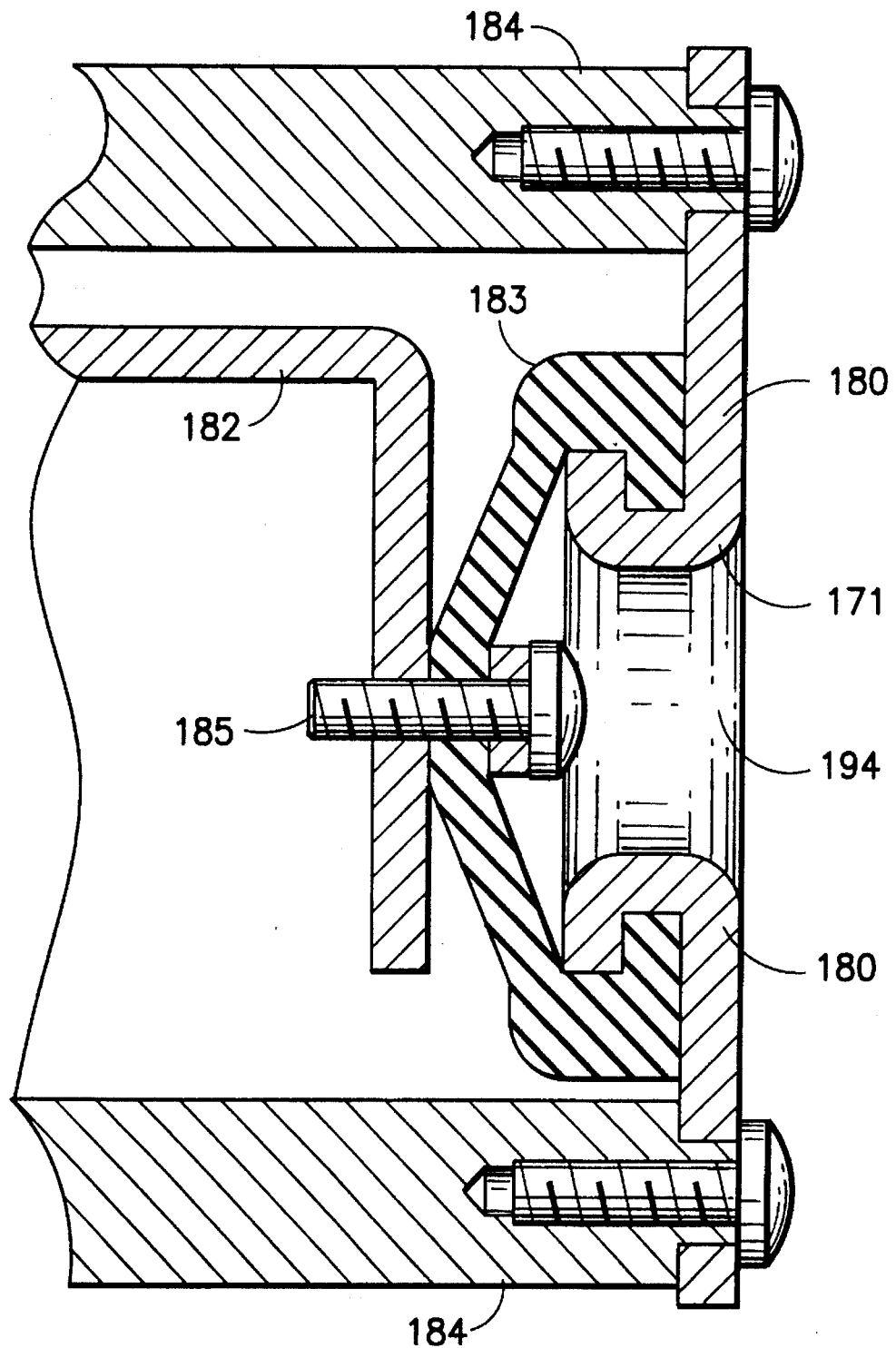
FIG. 8 is a view of a cross section of a rubber damper in the disk reader assembly of FIG. 7.

Referring to FIG. 8, an enlarged cross section of one of the rubber dampers 183 is shown connecting the mounting frame 182 to one of the end plates 180. A screw 185 and washer (not numbered) attach a center portion of the rubber damper 183 to the mounting frame 182. An annular inwardly directed flange of the rubber damper 183 is engaged within a flared lip 171 of an aperture 194 in the end plate 180. The aperture 194 has a sufficient diameter to provide clearance for a head of the screw 185. The rubber damper 183 has a cone shaped structure providing sufficient flexibility to function as a flexible suspension for isolating vibrations from the optical pick-up 203 and turntable 202. It is clear that alternative suspensions means, including springs, dashpots, and resilient plastics for example, are realizable by those skilled in the art, having viewed this disclosure, without departing from the spirit of the present invention.

Figure 9A:
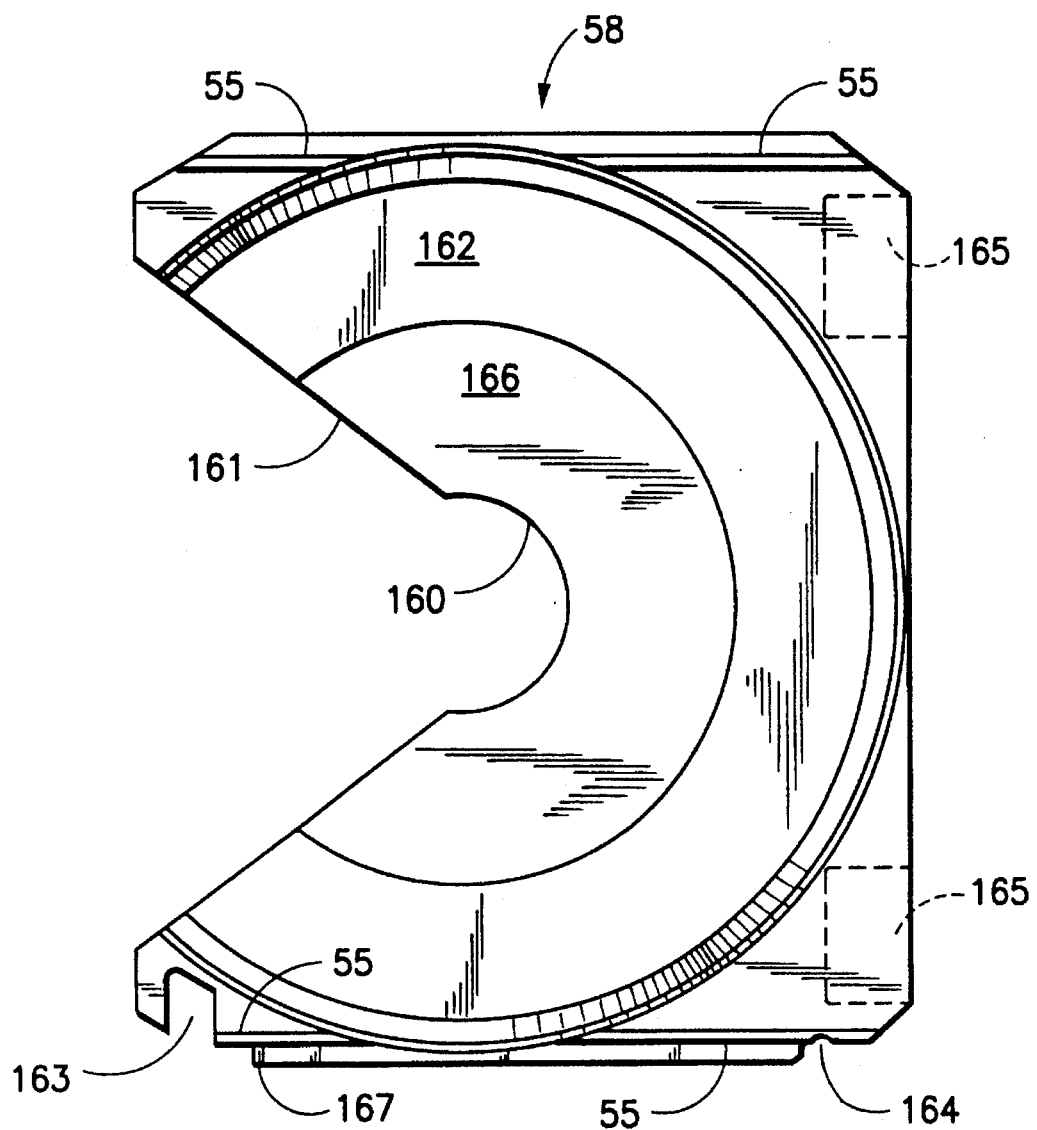
FIG. 9A is a plan view of a carriage of the disk player of FIG. 1.
Figure 9B:
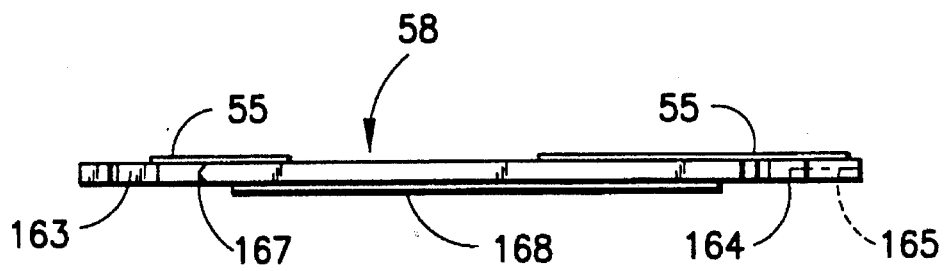
FIG. 9B is a side view of the carriage of FIG. 9A.
Figure 10:
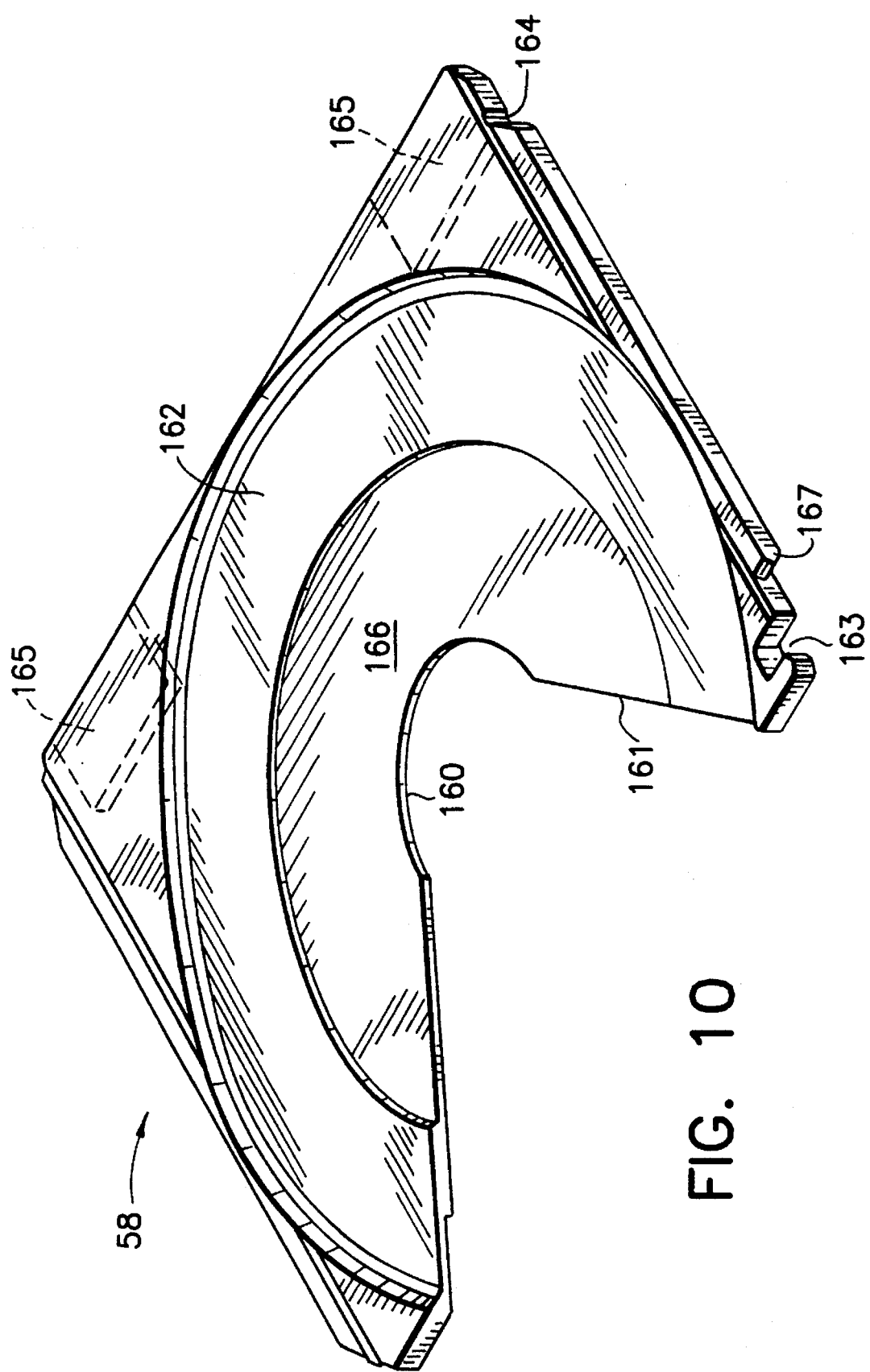
FIG. 10 is a perspective view of the carriage of FIG. 9A.

Referring now to FIGS. 9A, 9B, and 10, the base carriage 58 shown is also representative of the standard carriages 59 except as noted herein. The base carriage 58 has the clearance notch 161 and center are 160, discussed above, to provide access by the optical pick-up 203 and turntable 202 to the recording surface of a disk carried on the base carriage 58. The first and second circular recesses, 162 and 166, position disks on the base carriage 58 for proper alignment with the turntable 202 in the playback position shown in FIG. 3. The second circular recess 166 results in a surface protrusion 168 extending from a lower surface of the base carriage 58 as shown in FIG. 9B. The surface protrusion 168 is, however, absent in the standard carriages 59 which do not have the second circular recess 166. A shuttle engagement notch 163 in a right side of the base carriage 58 permits engagement by a shuttle arm 69 on the shuttle 28 (shown in FIGS. 1–4) to move base carriage 58 between its load, playback and store positions. A detent notch 164 on the right side of the base carriage 58 is engaged by a spring (not shown) when the base carriage 58 is stored in the magazine 50. A wedge-shaped protrusion 167 extends from the right side of the base carriage 58. Wedge-shaped protrusion 167 is engaged by a lifting mechanism (not shown), as is described below. Rectangular recesses 165 in a lower surface of the carriages 58 and 59 accept support prongs located within the magazine 50.

Guide ridges 55 extend upward from a top surface of all carriages 58 and 59. Guide grooves (not shown) are formed in the lower surfaces of all carriages 58 and 59. The guide ridge 55 on the upper surface of each standard carriage 59 engages the guide groove in the lower surface of the next higher standard carriage 59 when the standard carriages are stacked in the magazine 50. Engagement between the guide ridges 55 and their mating guide grooves guide the standard carriages 59, as they are transported to and from the magazine 50.

Base carriage 58 has the same guide grooves as do standard carriages 59. However, the guide grooves in base carriage 58 are engaged by an external element, rather than by guide ridges in adjacent carriages, as will be explained below.

Figure 11:
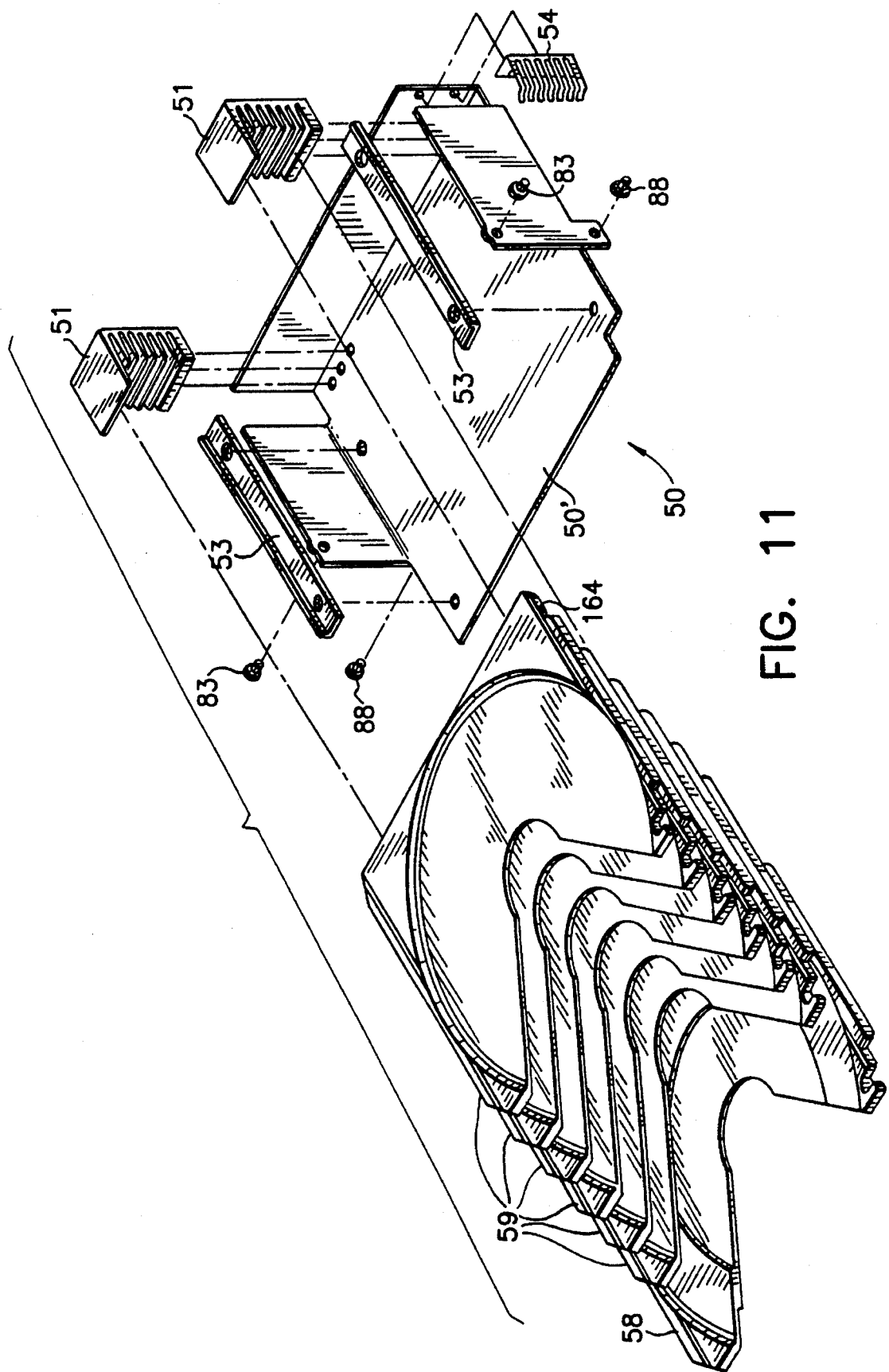
FIG. 11 is an exploded perspective view of a magazine of the disk player of FIG. 1.

Referring to FIG. 11, an exploded view of the magazine 50 and the base and standard carriages, 58 and 59, shows the standard carriages 59 stacked in the top six positions and the base carriage 58 in the bottom, or seventh position. A magazine chassis 50' has a pair of guide rails 53 mounted on a base surface which serve to guide and support the base carriage 58 as it is transported to and from the magazine 50. A pair of pronged racks 51 have support prongs for accepting the base and standard carriages, 58 and 59. The support prongs couple into the rectangular recesses 165 (FIGS. 9A and 10) in the carriages, 58 and 59, to support the standard carriages 59 when a selected carriage, 58 or 59, is removed from beneath the remaining standard carriages 59. The standard carriages 59 above a selected carriage are pivoted upon the support prongs in an upward direction by the lifting mechanism described below. Embodiments of the present invention include constructions wherein the carriages, 58 and 59, rest upon each other or are supported by the support prongs when not in a lifted state. It is further realized that other embodiments of the present invention could provide for slot recesses in the magazine 50 for accepting protrusions from the carriages, 58 and 59, in order to pivotally support the carriages, 58 and 59.

A detent spring member 54 mounts on a back panel of the magazine chassis 50'. Spring fingers on detent spring member 54 engage the detent notches 164 of the carriages, 58 and 59, to retain them within the magazine 50. Upper and lower guide pins, 83 and 88, fixed to sides of the magazine 50, travel in the vertical guide slots, 70 and 71, of the right and left side plates, 82 and 84, of the main chassis shown in FIG. 5.

Figure 12:
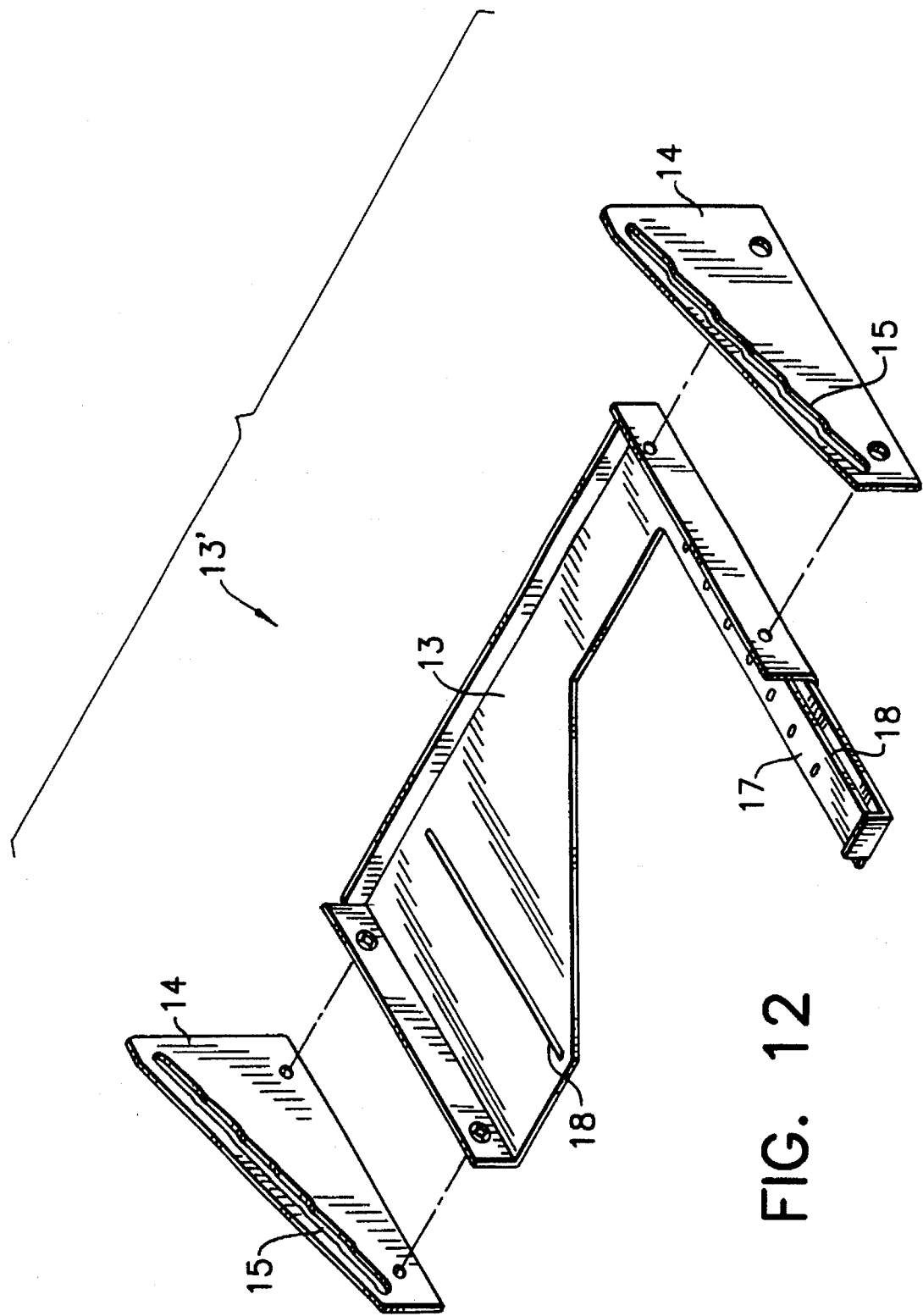
FIG. 12 is an exploded perspective view of a cam plate assembly of the disk player of FIG. 1.

Referring now also to FIG. 12, the magazine 50 sits within a cam plate assembly 13'. Cam plate assembly 13' includes cam plates 14 attached to a cam plate chassis 13. The lower guide pins 88 slide in stepped cam slots 15 to raise and lower the magazine 50 as the cam plate assembly 13' is moved forward and backward. The cam plate chassis 13 has a pair of parallel guide pin slots 18 which accept guide pins 12 (shown in FIG. 16) in the bottom plate 11 of the main chassis to ensure parallel movement. The cam plate chassis 13 also has a rack 17 (partially hidden in FIG. 12) which engages a vertical drive assembly described below.

Figure 13:
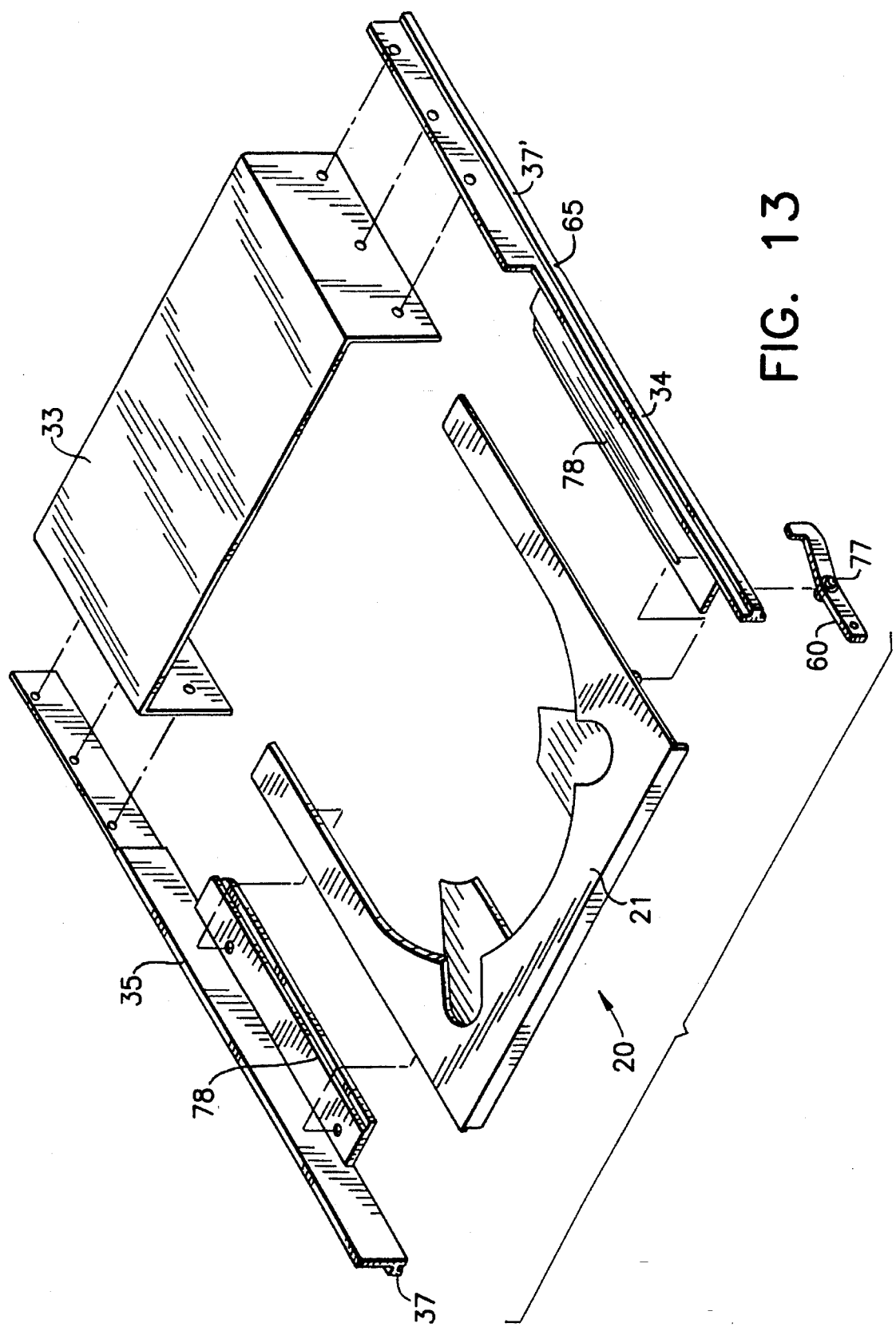
FIG. 13 is an exploded perspective view of the tray of the disk player of FIG. 1.

Referring to FIG. 13, the tray 20 has a tray plate 21 fixed to the left and right side members, 35 and 34, which are connected by a U-shaped bridge 33. The left and right side members, 35 and 34, have left and right rails, 37 and 37'. The right rail 37' has a rack (not shown) on a lower surface which engages the transport mechanism described below. A pair of support plates 78 hold the tray plate 21 and extend into an opening defined by the tray plate 21 to support the carriages, 58 and 59 (not shown in FIG. 13), transported on the tray 20. A shuttle lock lever 60 is rotatably attached to the right side member 34 by a pin 77. Shuttle lock lever 60 locks the shuttle arm 69 once any one of the carriages, 58 and 59, is in the tray 20. This fixes the carriage 59 relative to the tray while the tray 20 transports the carriage 59 between the ejection and load positions.

Figure 14:
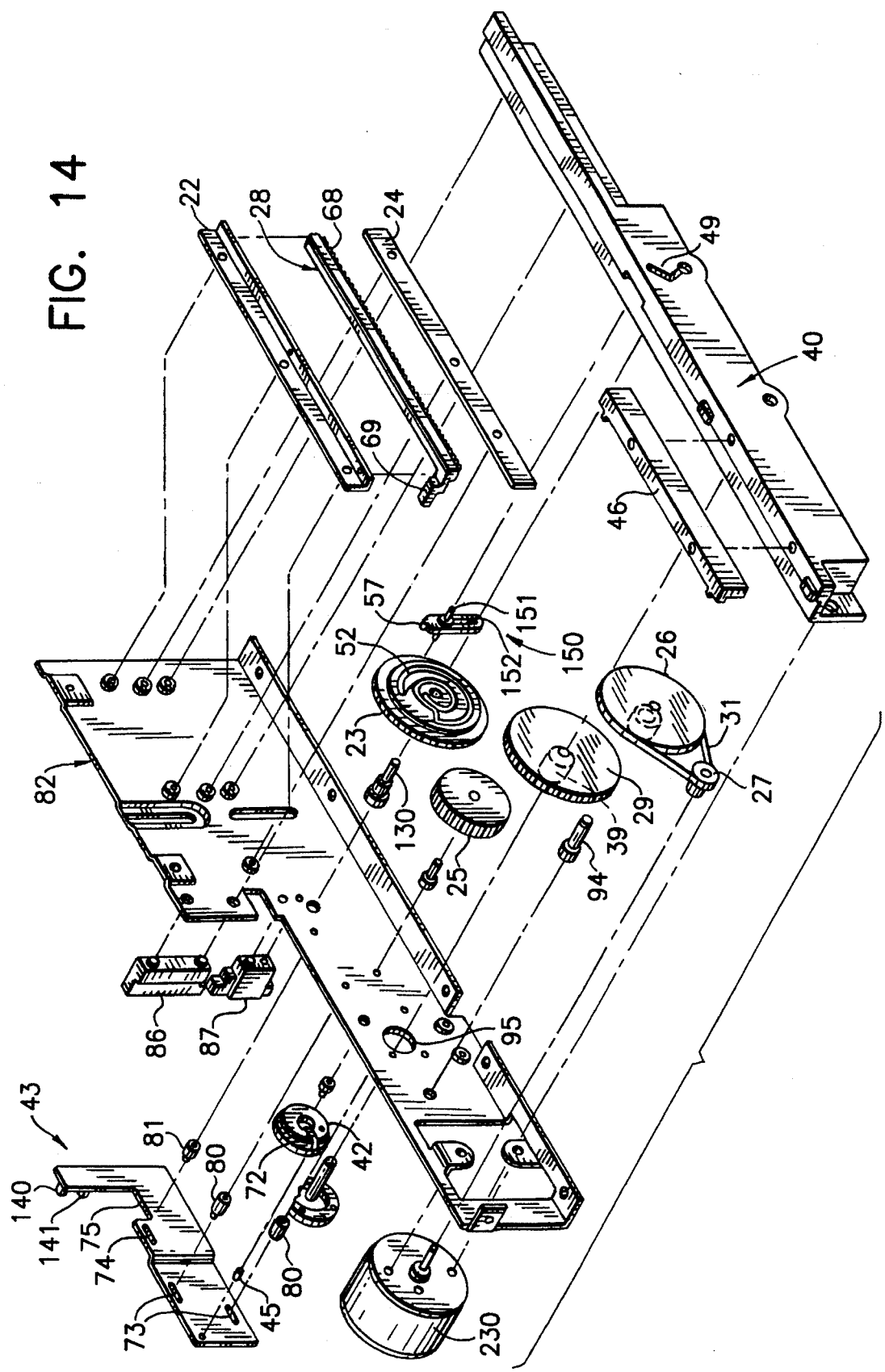
FIG. 14 is an exploded perspective view of a transport mechanism, on a right side plate of the main chassis of FIG. 5, for transporting the tray, carriages, and separating the carriages in the magazine.

Referring to FIG. 14, the right side plate 82 of the main chassis has first and second right rail support members, 40 and 46, which fit together to form a C-shaped slot for accepting the right rail 37' (FIG. 13) of the tray 20.

Figure 15:
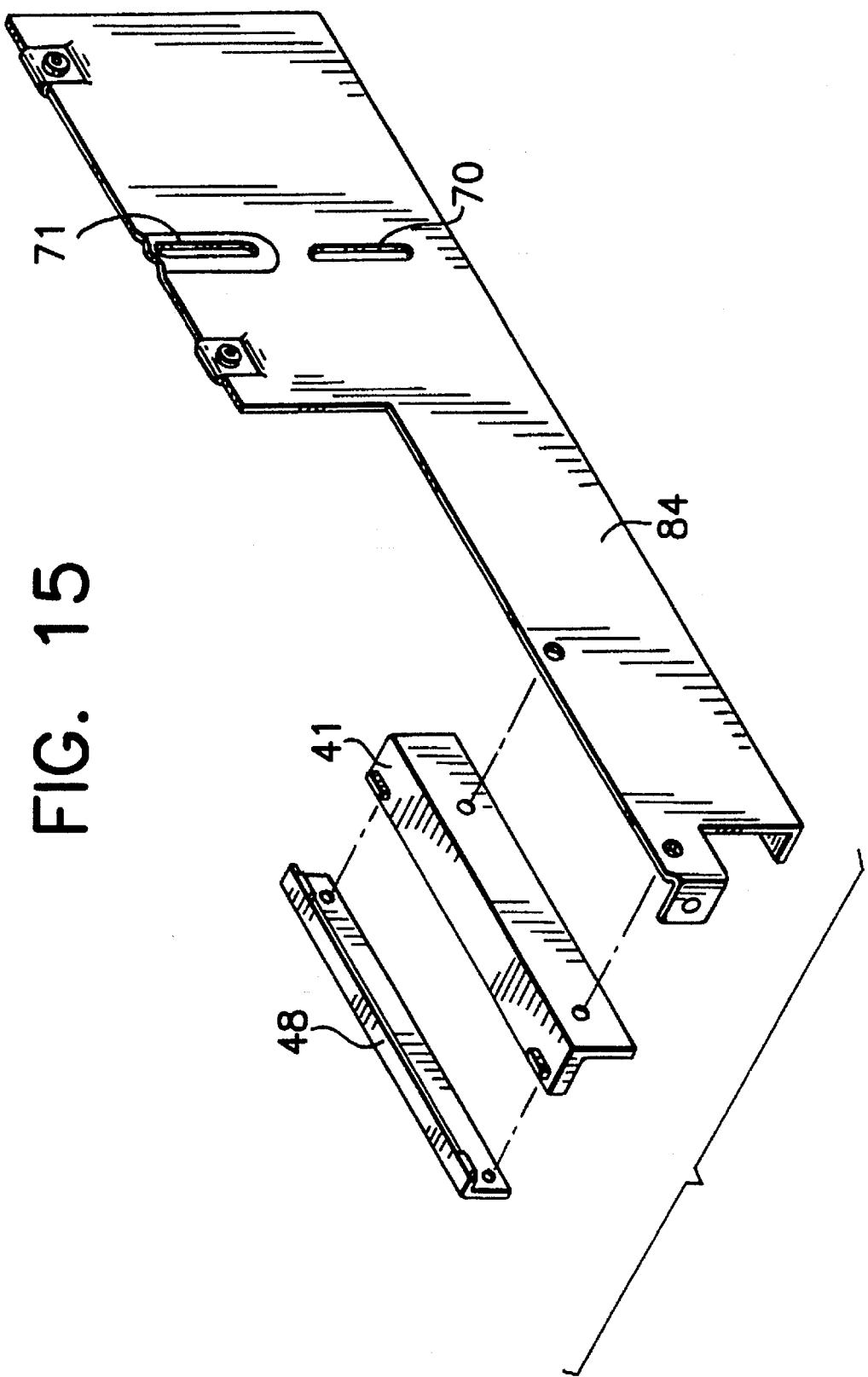
FIG. 15 is an exploded perspective view of a linear guide on a left side plate of the main chassis shown in FIG. 5.

Referring now to FIG. 15, the left side plate 84 of the main chassis has affixed thereto first and second left rail support members, 41 and 48, which form a C-shaped slot for the left rail 37 (FIG. 13) of the tray 20. The tray 20 is thus slidably held in the main chassis with the left and right rails, 37 and 37', constrained for linear motion.

Referring again to FIG. 14, the transport mechanism includes a motor 230, mounted to the right side plate 82. The torque output of motor 230 is coupled by a pulley 27 and a belt 31 to a first speed reduction gear 26 mounted on a shaft 94. A second speed reduction gear 29 engages the first speed reduction gear 26 and the rack of the right rail 37' to drive the tray 20 forward and backward. A drive gear 39 is integrally formed on the second speed reduction gear 29. The drive gear 39 passes through an aperture 95 to drive a lifter gear 42 of a lifter mechanism. The lifter mechanism separates adjacent higher ones of the carriages, 58 and 59 to provide clearance above a disk to be rotated and read.

The lifter mechanism has a lifter plate 43 with a lifter plate pin 45. Lifter plate pin 45 engages a lifter cam slot 72 on the lifter gear 42 (better seen in FIGS. 25–28). The lifter plate 43 is slidably supported by slots, 73 and 74, and support pins, 80 and 81, to permit forward and backward motion of the lifter plate 43 guided by lifter cam slot 72.

Figure 37:
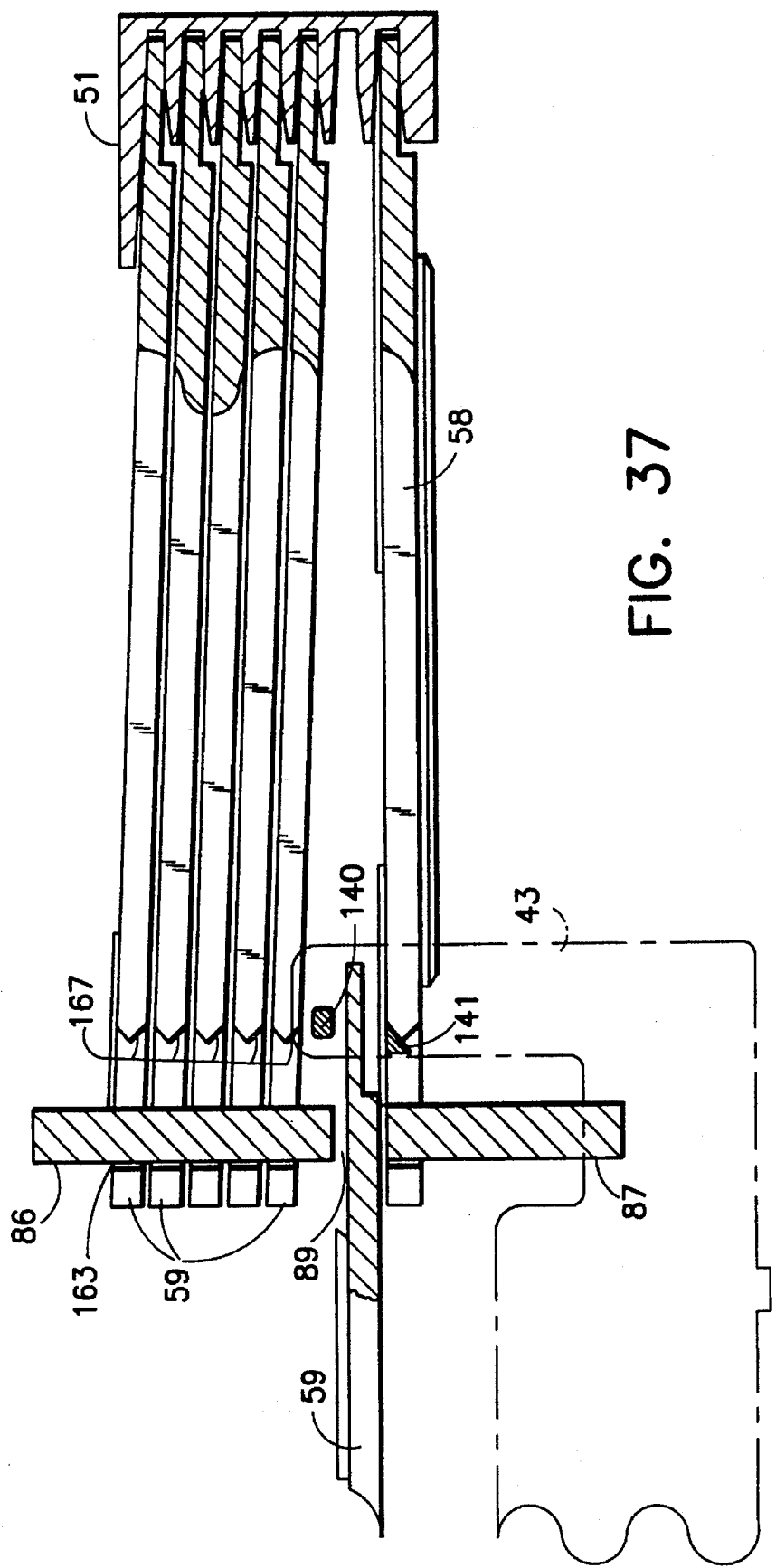
FIG. 37 is a side view, partially in cross section, of a magazine and a lifter plate of the lifter mechanism of FIG. 25 shown in the playback position.

Referring momentarily to FIG. 37, the lifter plate 43 has two protrusions, a carriage lifter 140 which is circular, and a carriage stopper 141 which has an inclined surface. The carriage lifter 140 engages the wedge-shaped protrusion 167 of the next higher one of the carriages 59 above the selected carriage 59 in the magazine 50 and lifts the next higher one carriage 59 to provide clearance above the selected carriage 59 so that the selected carriage 59 may be moved partly out of the magazine 50, and may be rotated and read in that position. Simultaneously, the carriage stopper 141 engages the first of the carriages, 58 or 59, below the selected carriage 59. The carriage stopper 141 functions as a keeper to hold the first of the carriages below the selected carriage, and all lower carriages, in the magazine 50 while the selected carriage moves outward.

The right side plate 82 also has affixed thereto carriage restrainers, 86 and 87, which are spaced apart to define a slot 89. The carriage restrainers 86, 87 fit into the shuttle engagement notches 163 of the carriages 58, 59 above and below the slot 89. The carriage aligned with the slot 89, however, is free to move in and out of the slot 89. The slot 89 is sufficiently narrow to permit only one carriage to pass through at a time. Therefore, the magazine 50 must be positioned to align the slot 89 with the selected carriage to permit the selected carriage to be moved outward to the playback or ejection positions. Thus, the carriage restrainers 86, 87 retain the non-selected carriages when the selected carriage is moved to the playback or ejection positions. The process is reversed for replacing the selected carriage into the magazine 50.

The carriage restrainers 86, 87 are arranged perpendicularly to the carriages 58, 59. When the magazine 50 moves up and down, carriage restrainers 86, 87 remain within the shuttle engagement notches 163 of the carriages 58, 59. This arrangement permits the carriages 58, 59 to be moved vertically with the magazine 50 without being hindered by the carriage restrainers 86, 87. The carriage restrainers 86, 87 are positioned between the edges of the carriages 58, 59 closest to the playback position. Thus, no additional space between the playback position and the carriages 58, 59 is required.

Figure 39:
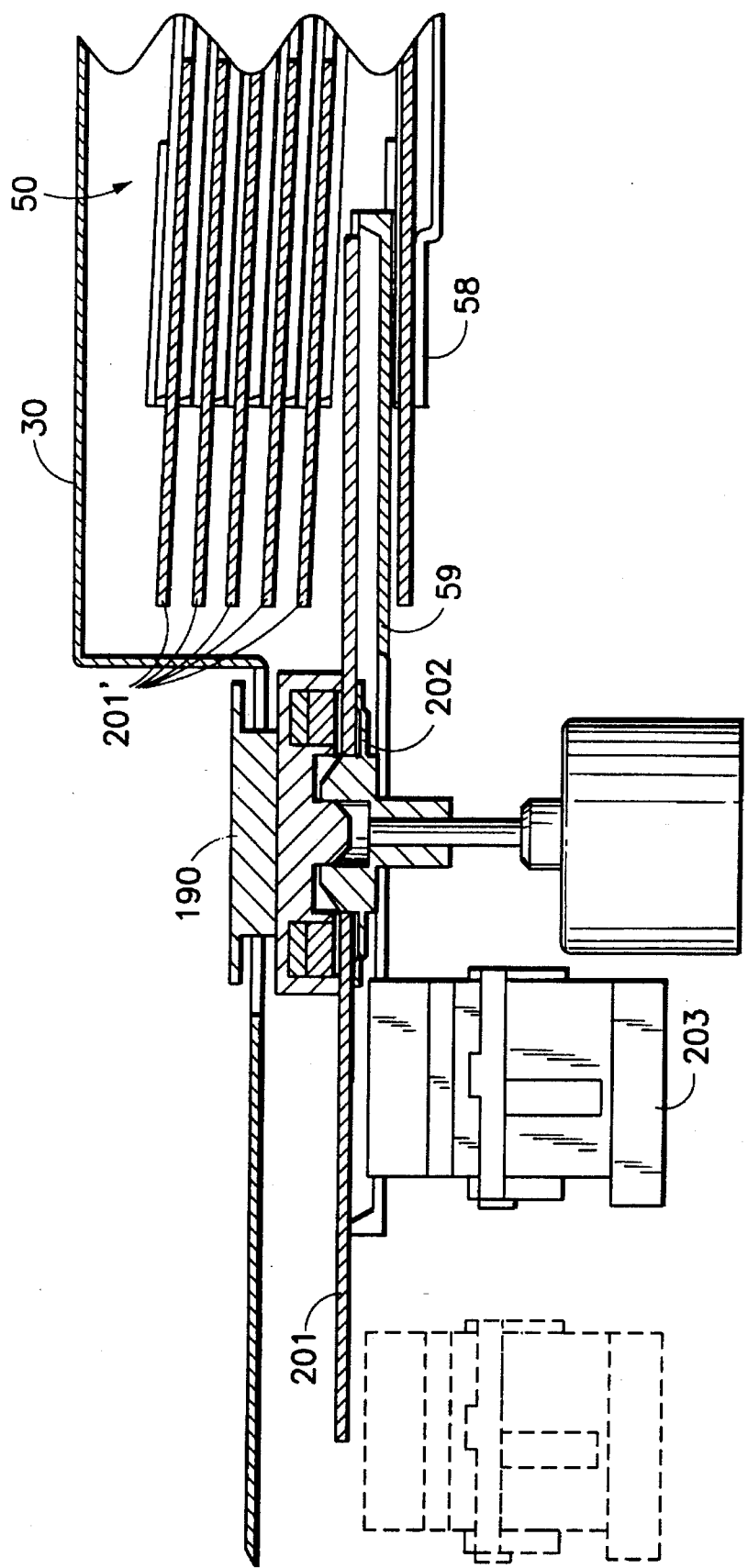
FIG. 39 is a side view of a cross section of the disk player of FIG. 1 showing a disk, in the playback position, with the disk reader and the magazine filled with disks.

Referring now to FIG. 39, the lifter mechanism separates the carriages, 58 and 59, to provide sufficient clearance for the selected disk to be raised clear of a supporting carriage by the turntable 202. As will be explained, turntable 202 is hinged into position against the surface of a disk. Alternate embodiments could include mechanisms for linearly lifting the carriages, 58 and 59, and mechanisms for depressing carriages below a selected carriage where a selected disk is lowered onto a turntable instead of being raised. Furthermore, embodiments without lifter mechanisms wherein a magazine stores disks with sufficient clearance to allow a partially removed disk to be read by a disk reader can be effected. Finally, a disk player without carriages is realizable wherein disks are transported by means such as belts engaging edges of the disks. Such embodiments are considered to be within the scope and spirit of the present invention.

Returning to FIG. 14, the second speed reduction gear 29 also drives a shuttle gear 23 via a reversing gear 25. The shuttle gear 23 engages a rack 68 on a shuttle 28. A shuttle arm 69 protrudes laterally from shuttle 28. The shuttle 28 is slidably mounted to the right side plate 82 by guide members, 22 and 24. The shuttle arm 69 engages the shuttle engagement notch 163 (FIG. 9A) in the selected carriage to transport it.

The shuttle gear 23 has a cam slot 52 which engages a tray locking member 150. The tray locking member 150 has a slot 152 through which a shaft 130, upon which the shuttle gear 23 rotates, passes through. The tray locking member 150 also has a pin 151 which travels in a right angle slot 49 in the first right rail support member 40. The tray locking member 150 is cammed upward until a tooth 57 at its upper end engages locking notch 65 in the right rail 37' to hold the tray 20 (FIG. 13) in the load position.

Figure 16:
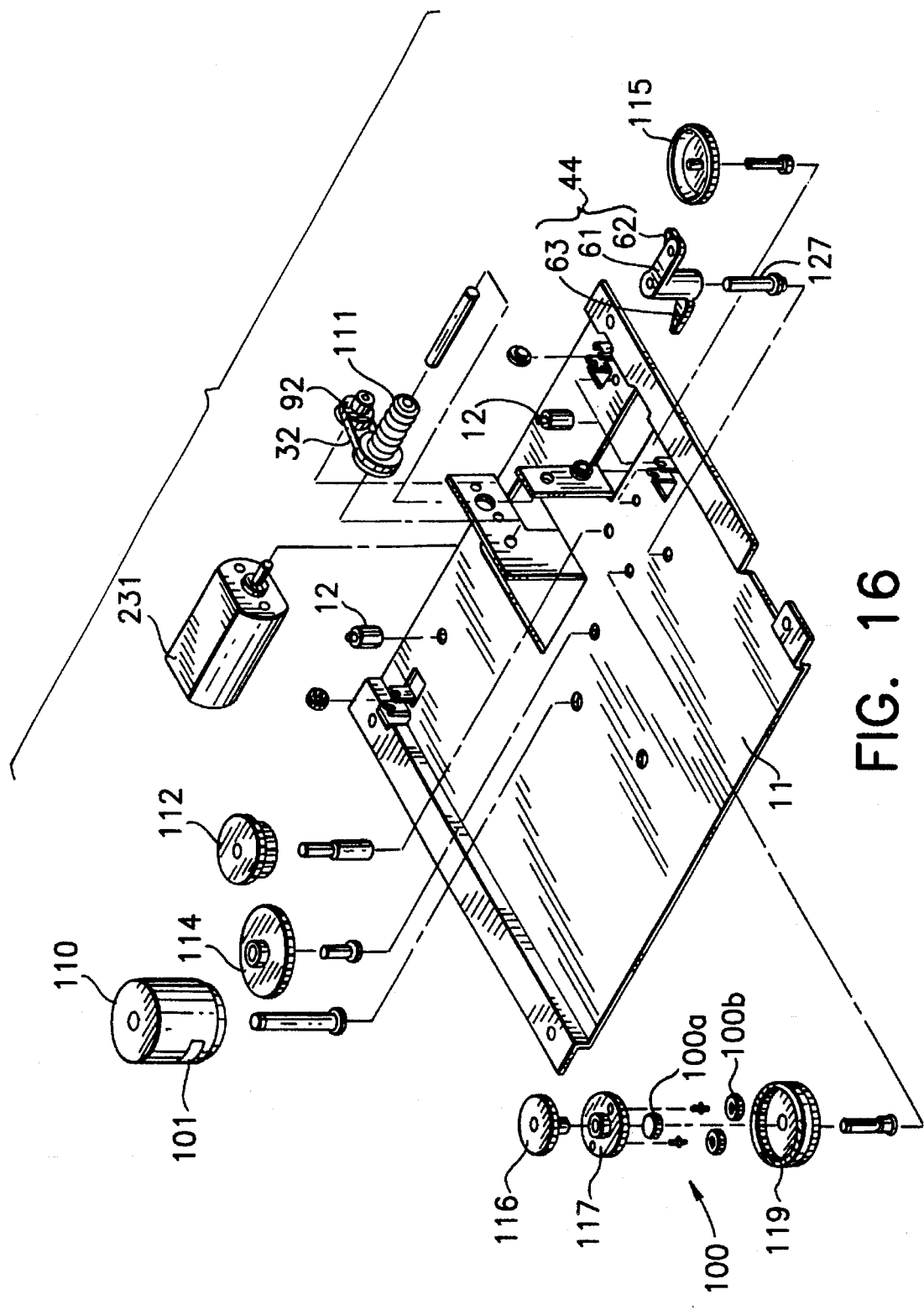
FIG. 16 is an exploded perspective view of a vertical drive mechanism, on a bottom plate of the main chassis of FIG. 5, for moving the magazine and the disk reader assembly.

Referring to FIG. 16, a vertical drive mechanism is mounted on the bottom plate 11 of the main chassis. The vertical drive mechanism includes a clamp driving mechanism for moving the disk reader assembly 200 to and from its clamping position, and a magazine driving mechanism for moving the magazine 50 via the cam plate assembly 13' of FIG. 12. A drive motor 231 provides power to drive both assemblies because the disk reader assembly 200 and the magazine 50 are moved at different times.

The drive motor 231 drives a worm gear 111 via a pulley 92 and belt 32. The worm gear 111 drives an associated speed reduction gear 112 which in turn drives an input gear 116 of a planetary gear assembly 100. The planetary gear assembly 100 includes a sun gear 100a, two planetary gears 100b, and an annulus gear serving as a second output gear 119. The input gear 116 rotates the sun gear 100a of the planetary gear assembly 100. A first output gear 117 acts as a cage driven by the planetary gears 100b. The first output gear 117 is coupled via a first speed reducing gear 115 to the rack 17 (FIG. 12) of the cam plate assembly to raise and lower the magazine 50. The second output gear 119 includes a toothed perimeter of the annulus gear that is coupled to a cam gear 110 via a second speed reduction gear 114. The cam gear 110 has a cam slot 101 which engages a lifting pin 186 (FIG. 7) on the support frame of the disk reader assembly 200 to pivot the disk reader assembly 200 between a clamped and an unclamped position.

If a first output of planetary gear assembly 100 is locked, rotational motion is shifted entirely to a second output and vice versa.

Figure 29:
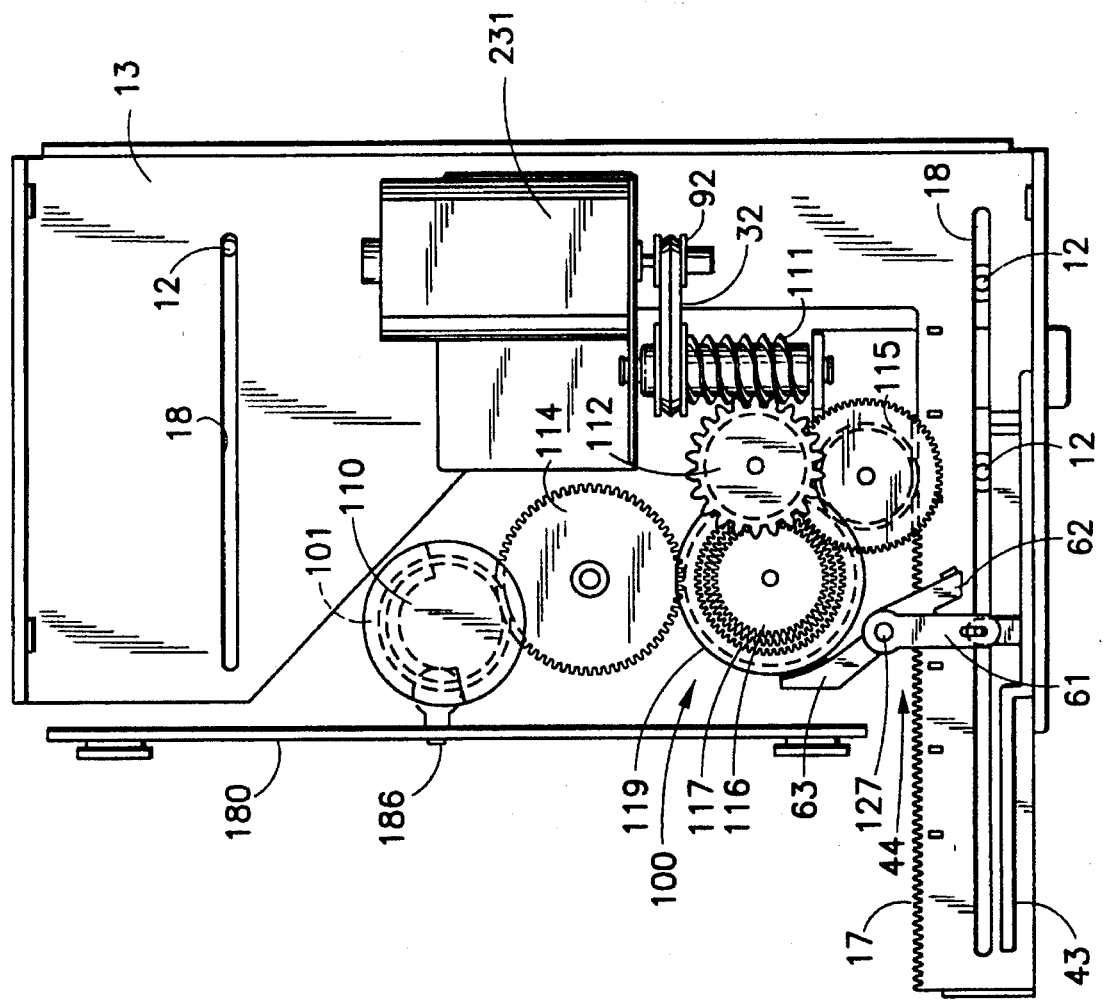
FIG. 29 is a plan view of the vertical transport mechanism of FIG. 16 shown in a magazine transport mode to place the magazine in a top position.

Referring now also to FIG. 29, a shifting member 44 pivots upon shaft 127 to select a desired output from the planetary gear assembly 100. The shifting member 44 has a first arm 61 which engages the lifter plate 43 which in turn pivots the shifting member 44 between a first and a second position. In a first position, an end of a second arm 62, which is covered by rubber to increase friction, is forced into contact with the first speed reduction gear 115 which in turn locks the first output gear 117. Locking the first output gear 117 channels the output of the drive motor 231 to the second output gear 119 which drives the cam gear 110 to raise and lower the disk reader assembly 200 (FIG. 7) upon the pivot pins 188. Alternatively, the lifter plate 43 moves the first arm 61 into a second position, rotating it clockwise, which forces a rubber tipped end of a third arm 63 against the second output gear 119 to lock it. The first output gear 117 is then forced to drive the cam plate assembly for raising and lowering the magazine 50.

Figure 17:
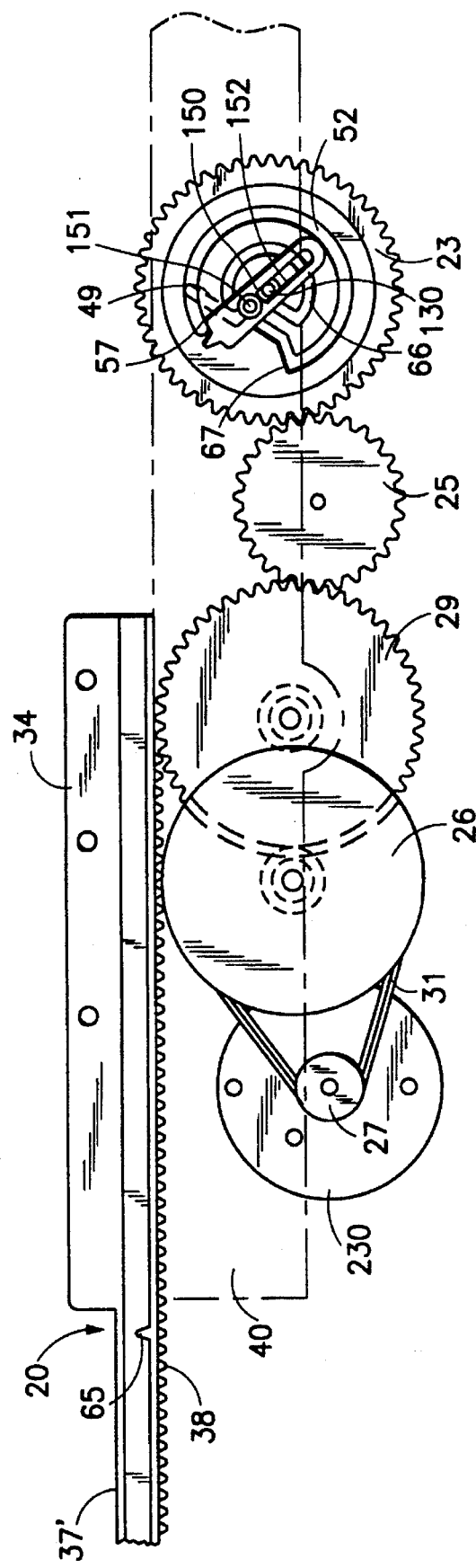
FIG. 17 is a side view of a tray moving mechanism of the transport mechanism of FIG. 14 shown in the ejection position.
Figure 18:
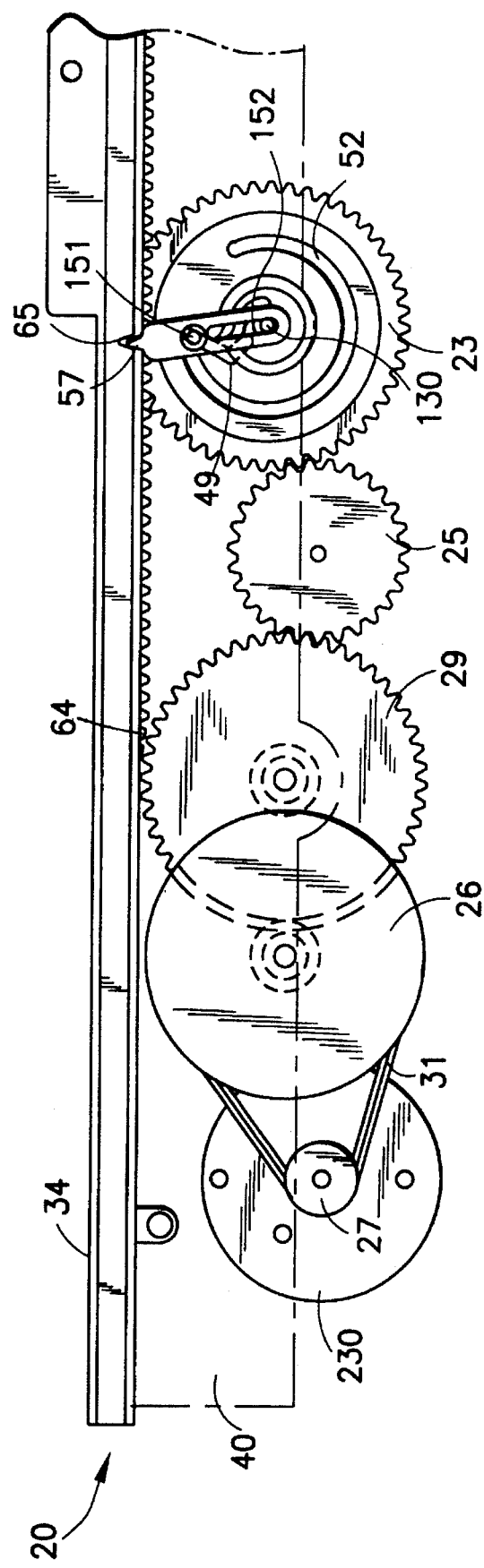
FIG. 18 is a side view of the tray moving mechanism of FIG. 17 shown in the load position.
Figure 21:
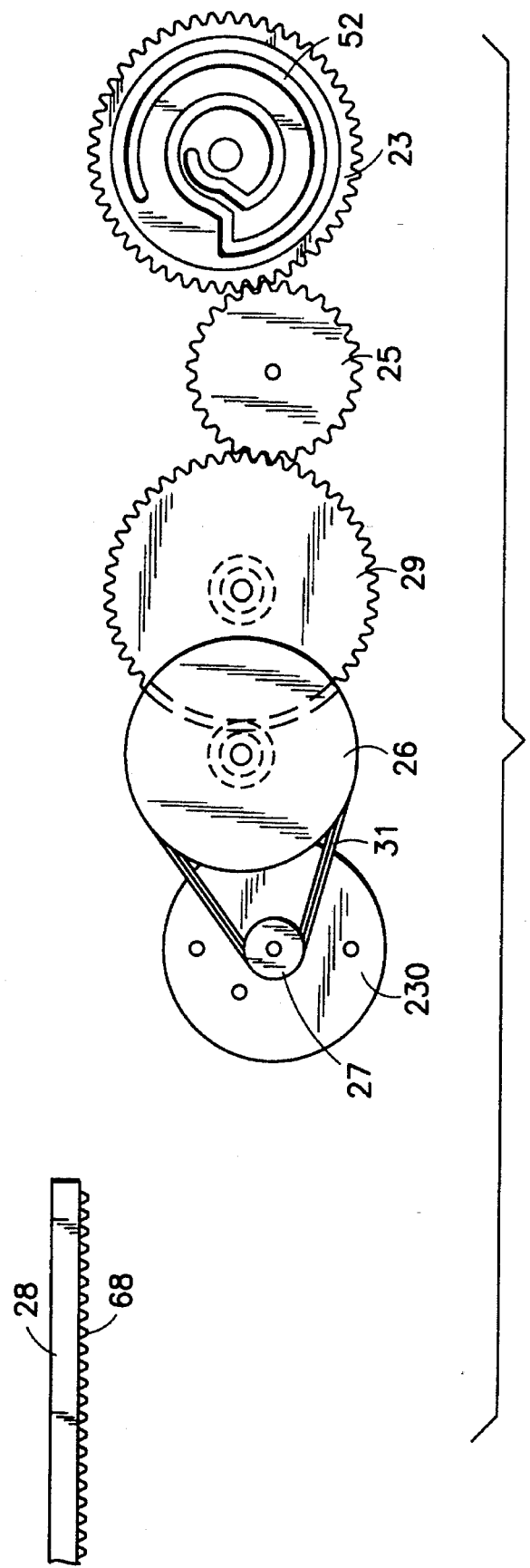
FIG. 21 is a side view of a carriage moving mechanism of the transport mechanism of FIG. 14 shown in the ejection position.
Figure 22:
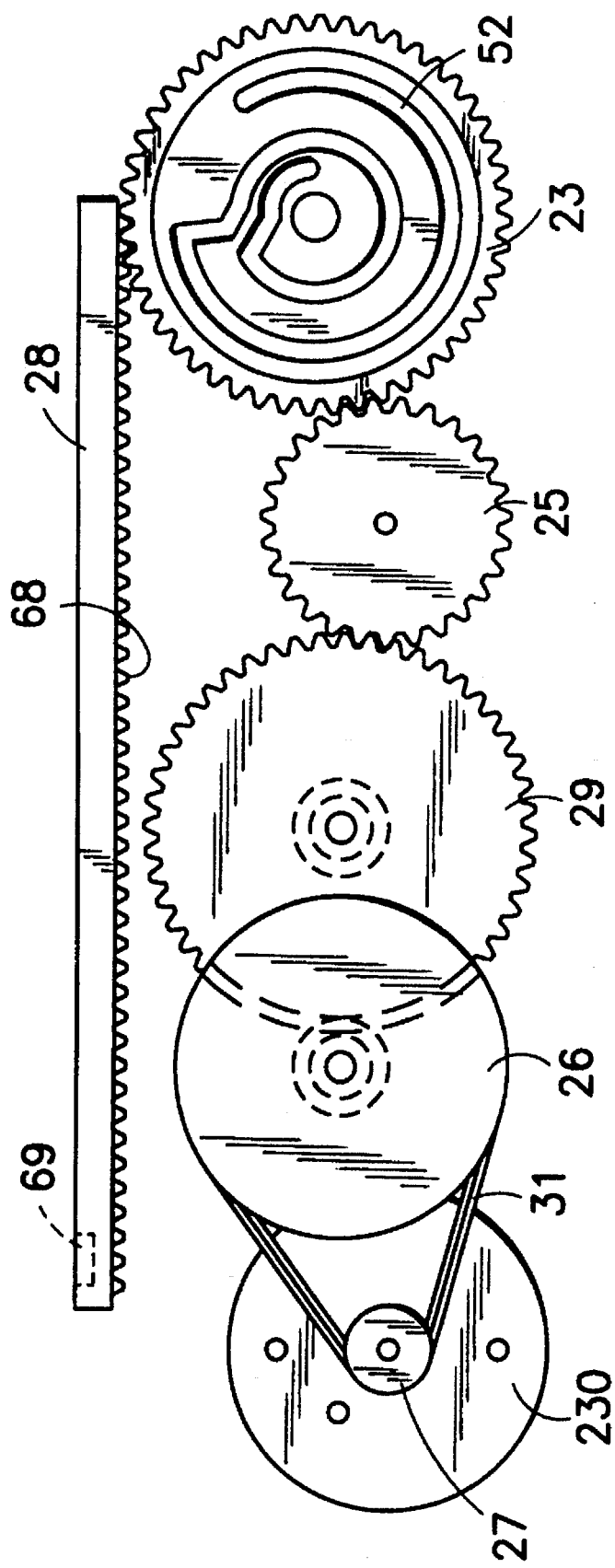
FIG. 22 is a side view of the carriage moving mechanism of FIG. 21 shown in the load position.
Figure 25:
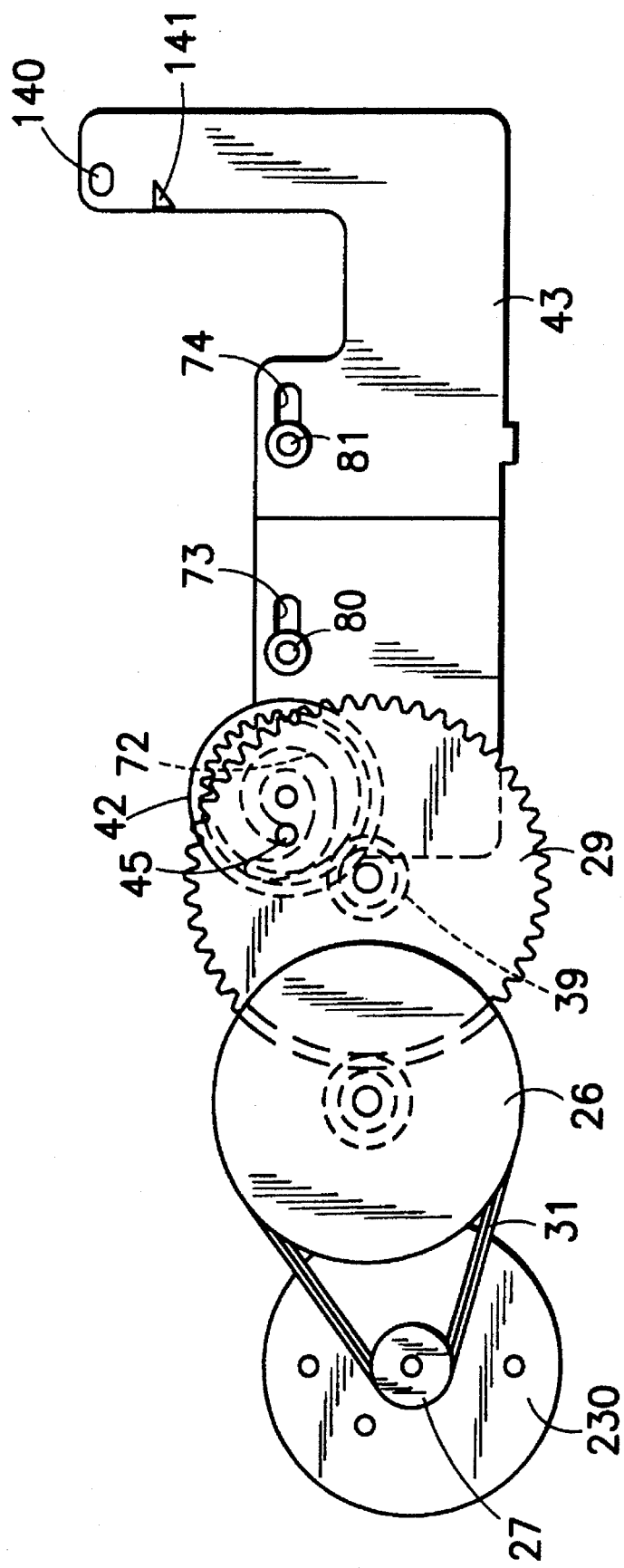
FIG. 25 is a side view of a lifter mechanism, of the transport mechanism of FIG. 14, shown in the ejection position.
Figure 26:
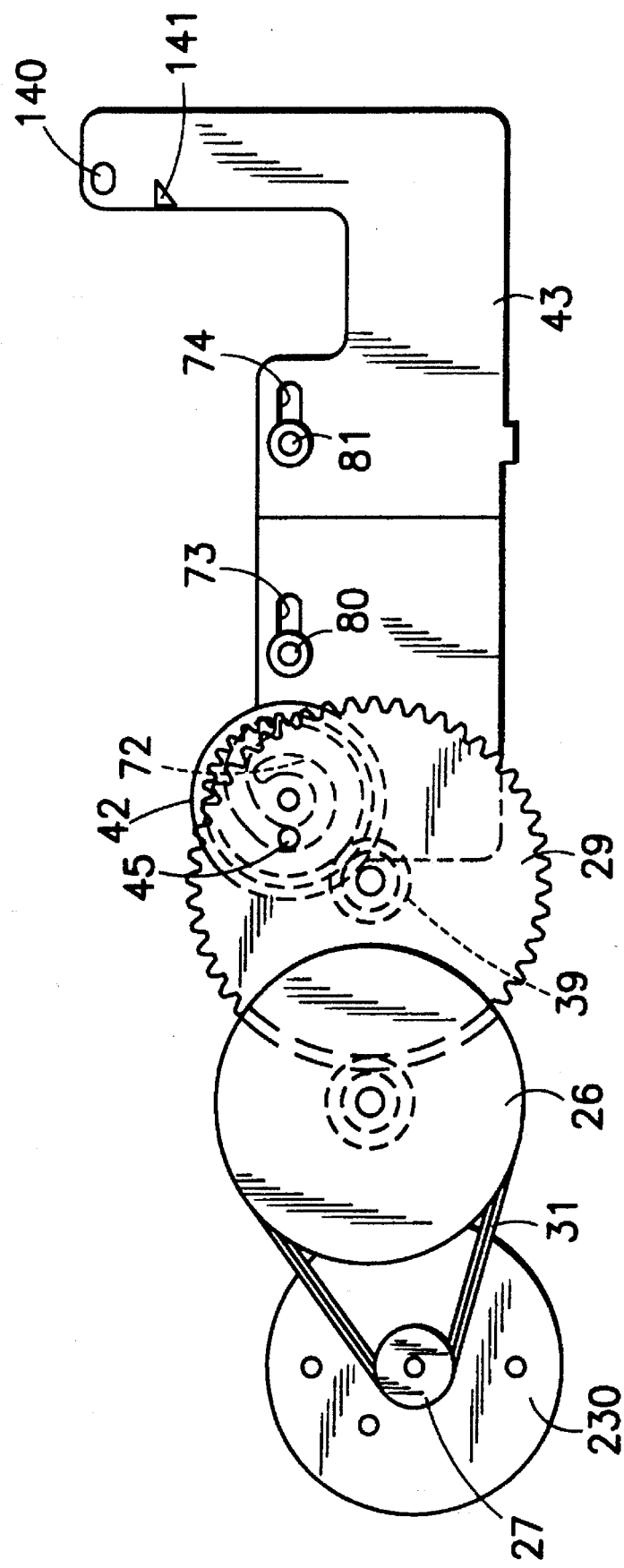
FIG. 26 is a side view of the lifter mechanism of FIG. 25 shown in the load position.

FIGS. 17–39 illustrate the operation of the present invention by detailing the states of the above referenced mechanisms when the disk player 1 is in each of the four states of FIGS. 1–4, the ejection position, the load position, the playback position, and the store position. The mechanisms illustrated include the transport mechanism used to transport both the tray 20 and a selected carriage, the lifter mechanism, and the vertical drive mechanism for moving the magazine 50 and disk reader assembly 200. The mechanisms in states associated with the ejection position, illustrated in FIG. 1, are shown in FIGS. 17, 21, and 25. States associated with the load position, illustrated in FIG. 2, are shown in FIGS. 18, 22, and 26. States associated with the playback position, depicted in FIG. 3, are shown in FIGS. 19, 23, 27, 33, and 34. And finally, states associated with the store position, of FIG. 4, are shown in FIGS. 20, 24, 28, 29, 30, 31, 32, and 38.

Referring to FIGS. 17–20, the transport mechanism operation is described below wherein the tray 20 is transported from an ejection position to a load position. In FIG. 17, the tray 20 is in the ejection position and the second speed reduction gear 29 is engaged with the rack 38 of the right rail 37'. The tray locking member 150 is in a lowered position with the pin 151 engaging the cam slot 52 at a position near a center of the shuttle gear 23. When the motor 230 is driven in a counter-clockwise direction, the second speed reduction gear 29 is driven clockwise moving the tray 20 toward the load position. Simultaneously, the shuttle gear 23 rotates clockwise and the pin 151 travels through a first advancing portion 66 of the cam slot 52 to a position further from the center of the shuttle gear 23 such that the pin 151 approaches a corner of the right angle slot 49 in the first right rail support member 40 (FIG. 14).

Figure 19:
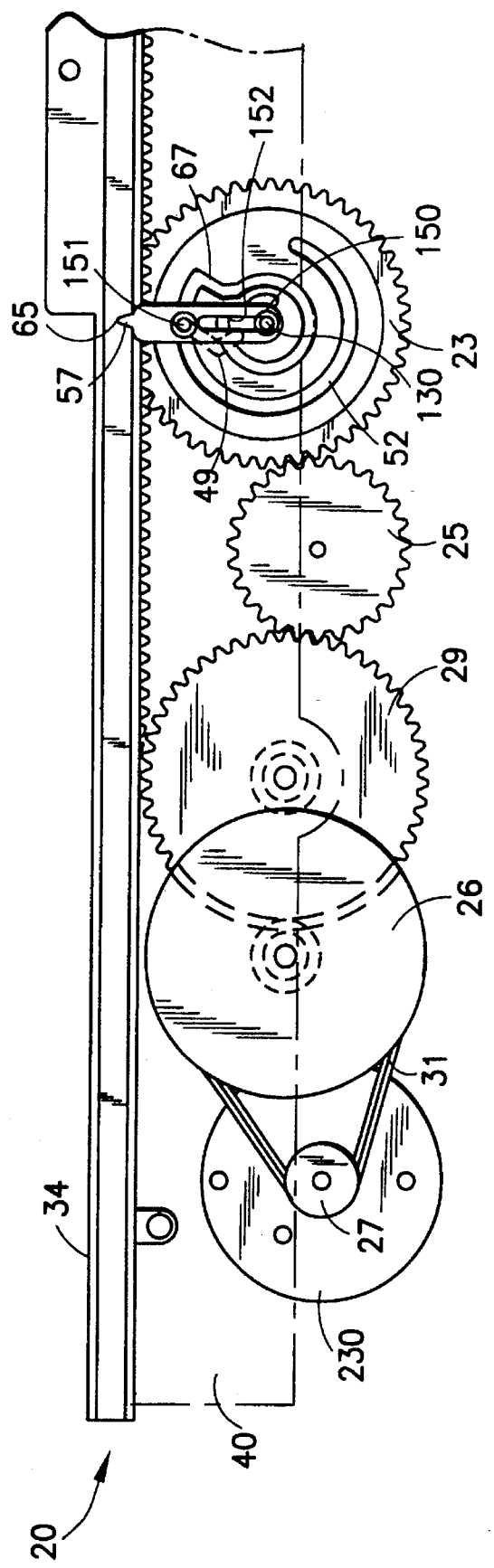
FIG. 19 is a side view of the tray moving mechanism of FIG. 17 shown in the playback position.

Referring now to FIG. 18, the tray 20 has progressed to a position in which the second speed reduction gear 29 no longer engages the rack 38 because teeth are reduced in height at a tapered end 64 of the rack 38. Since teeth of the second speed reduction gear 29 are in close proximity to the teeth of the rack 38, intermittent contact between the rack 38 and the second speed reduction gear 29 is possible due to vibrations. To avoid such intermittent contact, the tray locking member 150 is positioned with the tooth 57 in partial engagement with the locking notch 65 of the right rail 37' in preparation for moving the rack 38 away from the second speed reduction gear 29. The tray locking member 150 is moved by a second advancing portion 67 (shown in FIG. 17) of the cam slot 52 to further distance the pin 151 from center of the shuttle gear 23. In FIG. 19, engagement of the tooth 57 in locking notch 65 moves the tray 20 into accurate alignment with the load position as the pin 151 advances to an outer periphery of the cam slot 52. The tray locking member urges the rack 38 completely out of engagement with the second speed reduction gear 29 with a selected one of the carriages, 58 and 59, (not shown) advanced from the tray 20 to the playback position by the shuttle 28 (not shown) as is described below.

Figure 20:
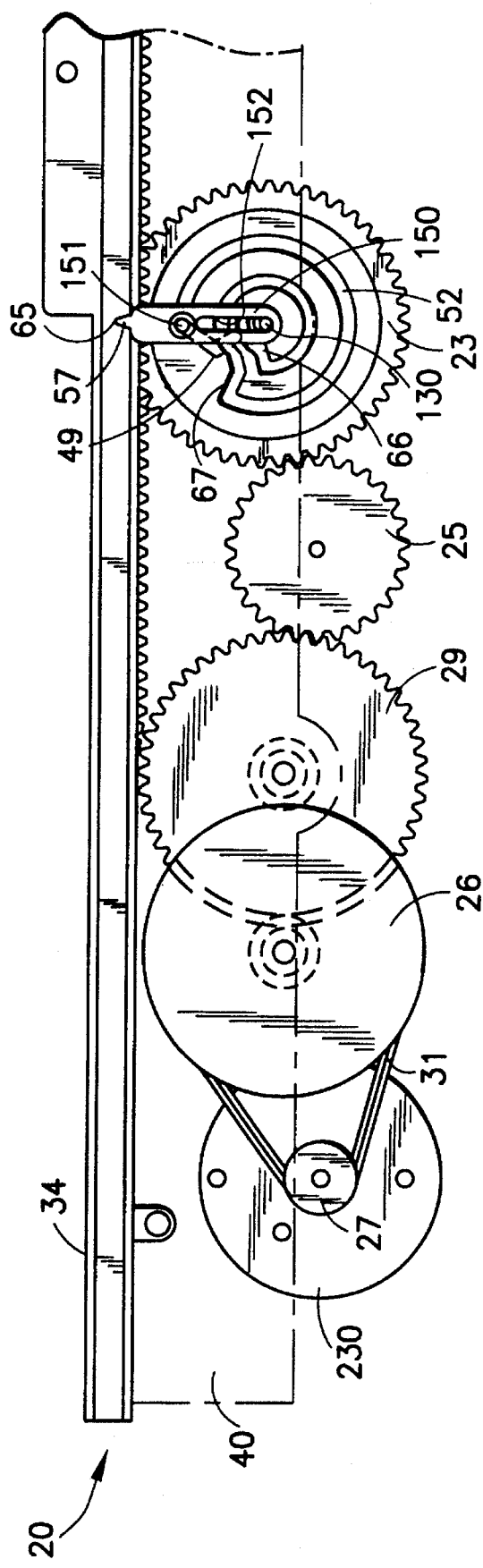
FIG. 20 is a side view of the tray moving mechanism in the store position.

Referring to FIG. 20, the shuttle gear 23 continues to rotate to transport the selected carriage to the store position. The pin 151 of the tray locking member 150 is advanced to an end of an outer periphery of the cam slot 52. The outer periphery of the cam slot 52 permits the shuttle gear 23 to continue to rotate while the tray locking member 150 remains in a locking position retaining the tray 20 in the load position. Simultaneously, the shuttle 28 transports the selected carriage toward the store position.

Referring again to FIG. 3, the tray 20 is shown in the load position in which the base carriage 58 and the disk 201 are advanced to the playback position. The disk 201 and base carriage 58 overlap the non-selected standard carriages 59 and stored disks 201' permitting the compact construction of the disk player 1. The optical pick-up 203 moves in a direction parallel to the transport direction of the disk 201 also facilitating compact construction. The advantage of retaining the tray 20 in the load position while the carriage 58 is advanced to the playback position is demonstrated by a travel of the optical pick-up 203 past the outer perimeter of the disk 201 when the optical pick-up 203 is at a left-most extreme position. If the carriage 58 was not displaced from the tray 20 to the playback position, the tray 20 would require a clearance notch for the optical pick-up 203 which would require that the tray 20 be made longer which in turn would result in the tray extending further out from the disk reader assembly 200 in the ejection position.

Referring FIG. 21, the transport mechanism is shown in an ejection state where the tray 20 (not shown) is at the ejection position. As discussed above, the motor 230 drives the shuttle gear 23 which drives the shuttle 28 via the rack 68. In the ejection state the shuttle 28 is disengaged from the shuttle gear 28 and is carried by the tray 20 where it is held by the shuttle lock lever 60 shown in FIG. 13.

Referring to FIG. 22, the transport mechanism is advanced to the load state. The shuttle 28 is carried by the advance of the tray 20 to a position where the rack 68 is engaged with the shuttle gear 23. The shuttle lock lever 60 (FIG. 13) has been rotated to disengage the shuttle 28 so that the shuttle 28 is free to advance with the clockwise rotation of the shuttle gear 23.

Figure 23:
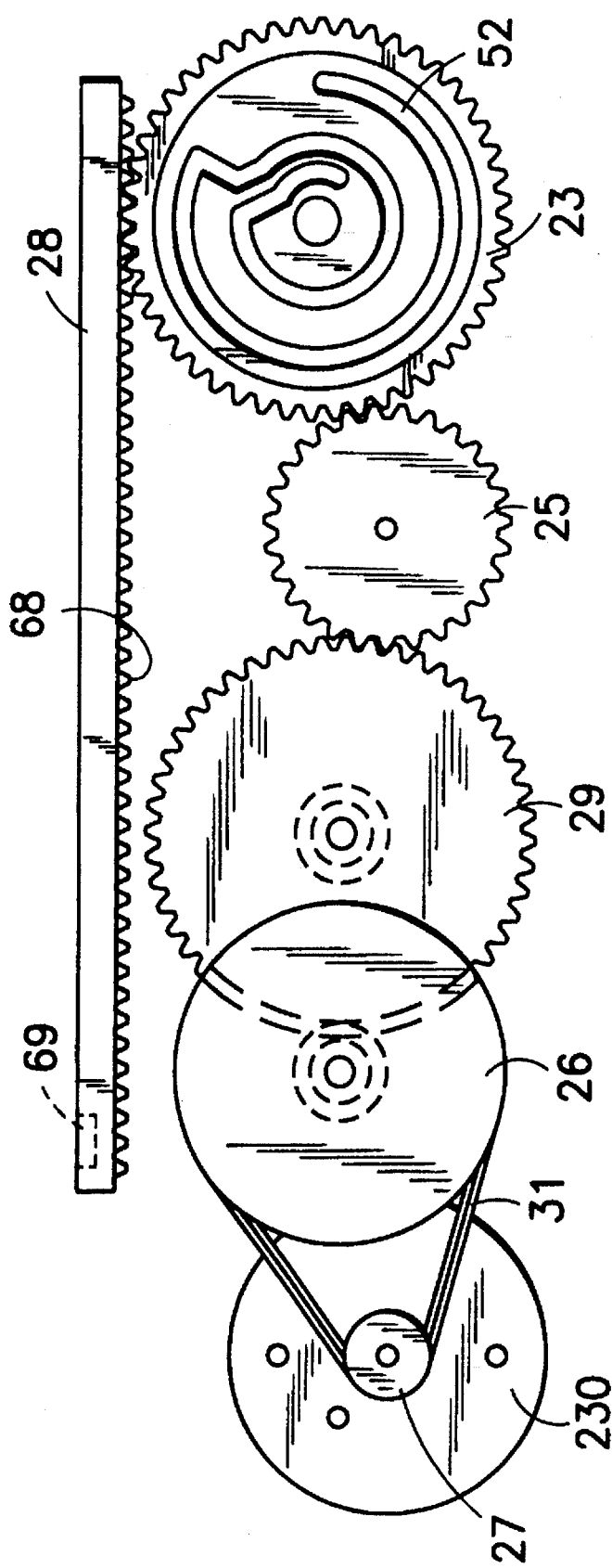
FIG. 23 is a side view of the carriage moving mechanism of FIG. 21 shown in the playback position.

Referring now to FIG. 23, the shuttle 28 is further advanced to the playback position where the selected carriage is withdrawn from the tray 20 and positioned above the disk reader assembly 200 by the shuttle arm 69 coupled with the shuttle engagement notch 163 (shown in FIG. 9A) of the selected carriage. Further clockwise rotation of the shuttle gear 23 advances the shuttle 28 to the store position wherein the selected carriage is placed in the magazine 50 in alignment with the other carriages, 58 and 59. Once in this position, the magazine transport mechanism can function to raise and lower the magazine 50 to select a disk as is described below.

Figure 24:
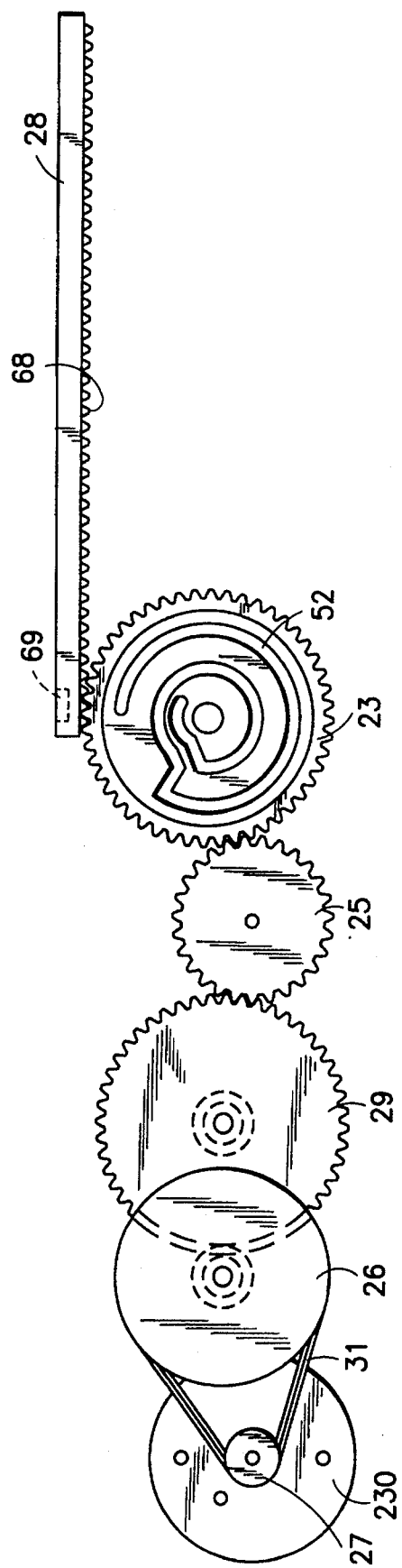
FIG. 24 is a side view of the carriage moving mechanism of FIG. 21 shown in the store position.

Referring now to FIG. 24, the limit of travel of shuttle 28 is shown in the store position. Shuttle gear 23 is rotated clockwise to a position at which an end portion of the cam slot 52 is closest to the shuttle 28.

Figure 27:
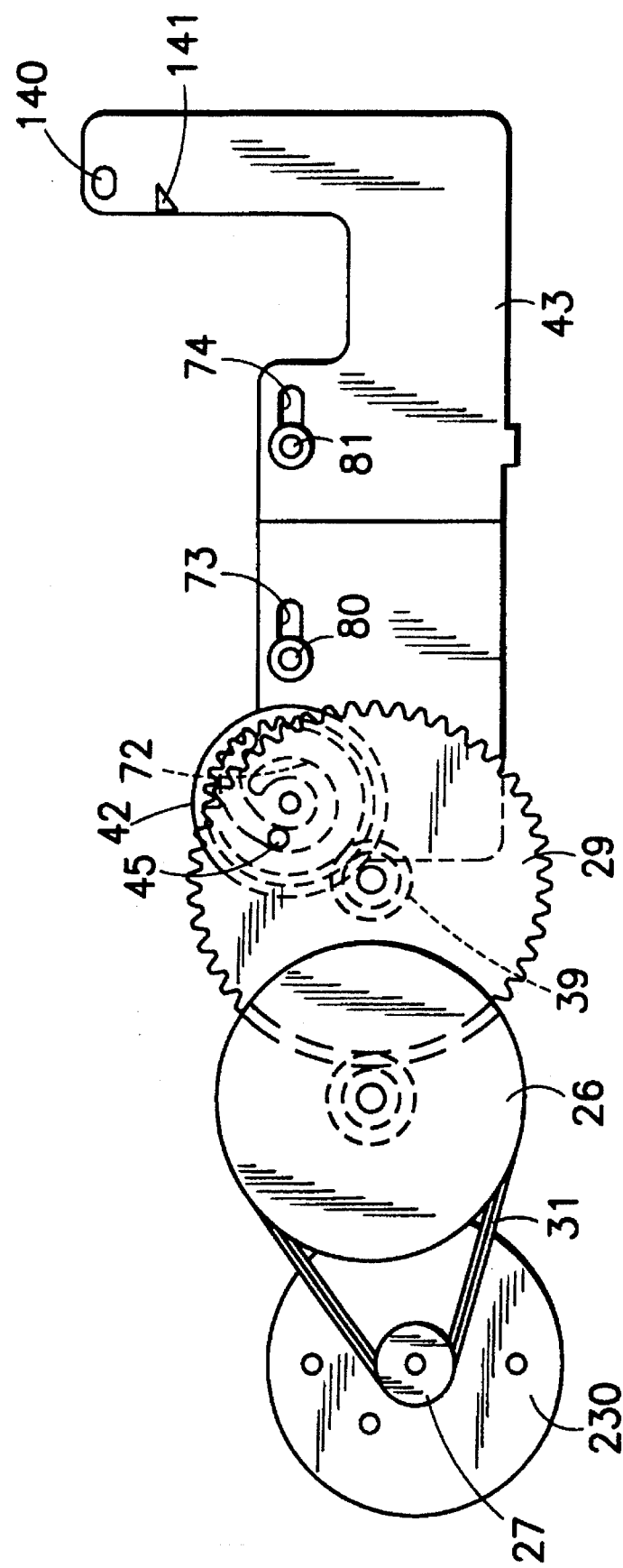
FIG. 27 is a side view of the lifter mechanism of FIG. 25 shown in the playback position.

Referring to FIGS. 25–28, in the operation of the lifter mechanism, the lifter plate 43 is actuated to lift all carriages above the selected carriage in the magazine 50 so that the selected carriage can be moved into or withdrawn from the magazine 50. In FIGS. 25, 26, and 27, the lifter mechanism is in states associated with the eject, load, and playback positions. During these states the lifter plate 43 remains shifted to the right of the figure to a position, as shown in FIG. 37, wherein the carriage lifter 140 is engaged with the wedge-shaped protrusion 167 of the carriage 59 immediately above the selected carriage 59. The carriage lifter 140 lifts the top five of the carriages 59 to provide clearance for the insertion or removal of the selected carriage. The top five carriages 59 are shown pivoting upon prongs of the pronged rack 51 which secures the carriages 59 in the magazine 50. The carriage stopper 141 engages a top portion of the wedge protrusion 167 of the base carriage 58 to keep the base carriage 58 in place while the selected carriage is withdrawn from the magazine 50. Additionally, the carriage restrainers, 86 and 87, which are mounted on the right side plate 82, fit into the shuttle engagement notch 163 of the carriages, 58 and 59, to retain them in the magazine 50. The lifter plate 43 is maintained in the extreme right position at all times with the exception of when the selected carriage is in the store position. The lifter plate pin 45 travels within a concentric portion of the lifter cam slot 72 during these states, shown in FIGS. 25–27, retaining lifter plate 43 at the extreme right position.

Figure 28:
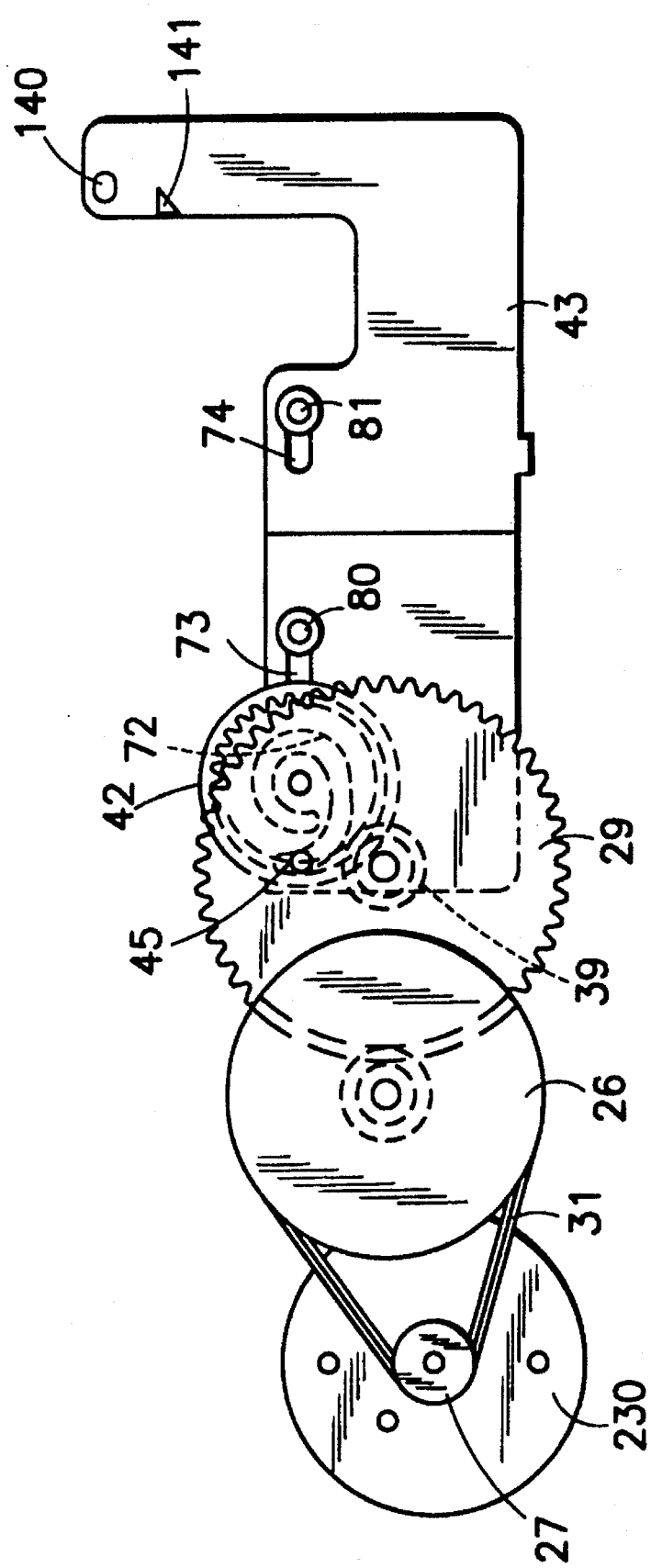
FIG. 28 is a side view of the lifter mechanism of FIG. 25 shown in the store position.
Figure 38:
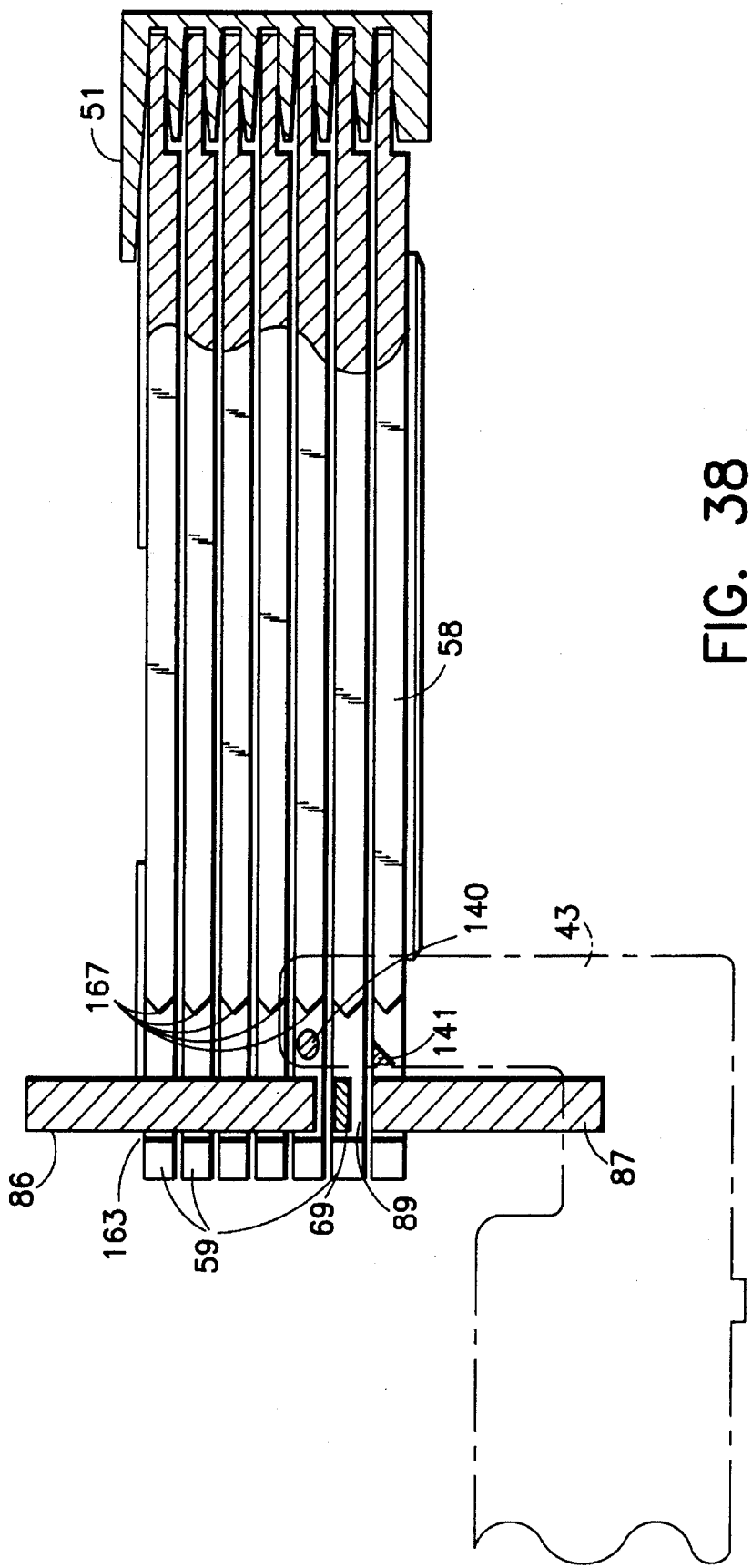
FIG. 38 is a side view of a lifter plate of the lifter mechanism of FIG. 25 shown in the store position.

Referring to FIGS. 28 and 38, the lifter plate 43 is shown in the store state where the lifter plate 43 is shifted to an extreme left position by the lifter cam slot 72 displacing the lifter plate pin 45 to the left and disengaging it from the wedge protrusions of the carriages, 58 and 59. In FIG. 38, the lifter plate 43 and the selected carriage are shown in the store position. Both the carriage lifter 140 and the carriage stopper 141 are clear of the wedge-shaped protrusions 167 and the shuttle arm 69 is aligned with the carriage restrainers, 86 and 87. The carriages, 58 and 59, then can be transported in a direction perpendicular to the disk recording surfaces by the magazine 50 to place a selected one of the carriages, 58 and 59 in alignment for loading or ejection.

The functions of transport of the tray 20 from the ejection position to the load position, the removal of the selected carriage from the tray 20 at the load position to the playback and store positions, and the lifting of the carriages 59 are all driven by the same motor 230 in a sequential fashion. This permits cost savings to be realized over embodiments employing separate motors for each operation.

Selection of one of the carriages, 58 and 59, is accomplished by vertical movement of the magazine as described above. Additionally, the playing of disks is accomplished by raising the disk reader assembly 200 with the selected disk in the playback position so as to lift the selected disk off the carriage, 58 or 59. Both operations are executed by the vertical drive mechanism discussed above with reference to FIG. 16.

Referring now to FIGS. 29–32, the operation of the vertical drive mechanism is illustrated wherein the magazine 50 is transported from a position selecting the seventh (lowest) disk to one selecting the first (highest) disk in the magazine 50.

Figure 30:
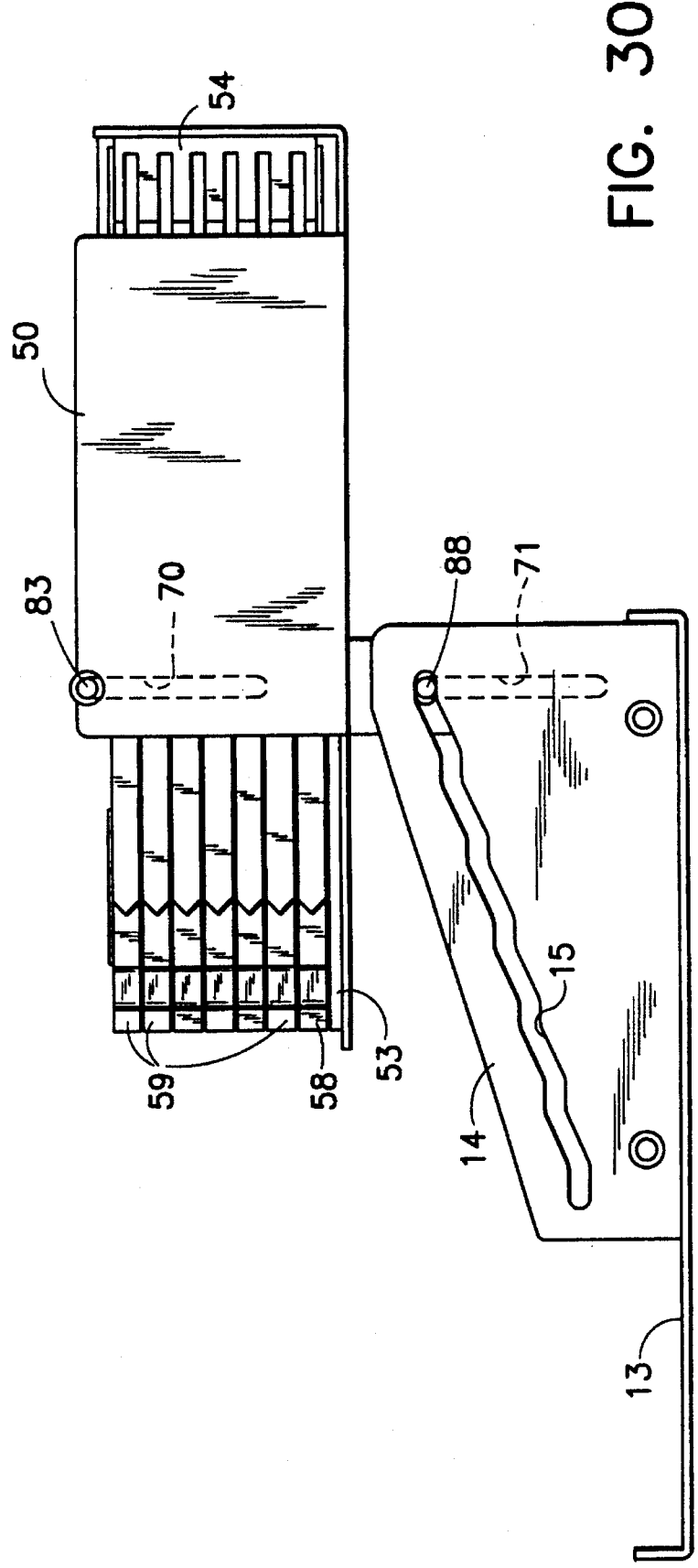
FIG. 30 is a side of the magazine and cam plate assembly showing the magazine in the top position.

In FIG. 29, the vertical drive mechanism is shown with the lifter plate 43 in the store position rotating the shifting member 44 clockwise by means of the first arm 61 so that the third arm 63 engages the second output gear 119 of the planetary gear assembly 100. With the second output gear 119 locked, the drive force of the motor 231 is transmitted via the first output gear 117 to the first speed reduction gear 115 which drives the rack 17 of the cam plate chassis 13. In FIGS. 29 and 30, the cam plate chassis 13 is shown shifted fully to the left of the figures. In this extreme left position, the magazine 50 is fully raised by the lower guide pins 88 resting in a top step of stepped cam slots 15. The seventh disk is now the selected disk. When the motor 231 is engaged, the cam plate chassis 13 is shifted to the right and is guided by the guide slots 18 and guide pins 12.

Figure 31:
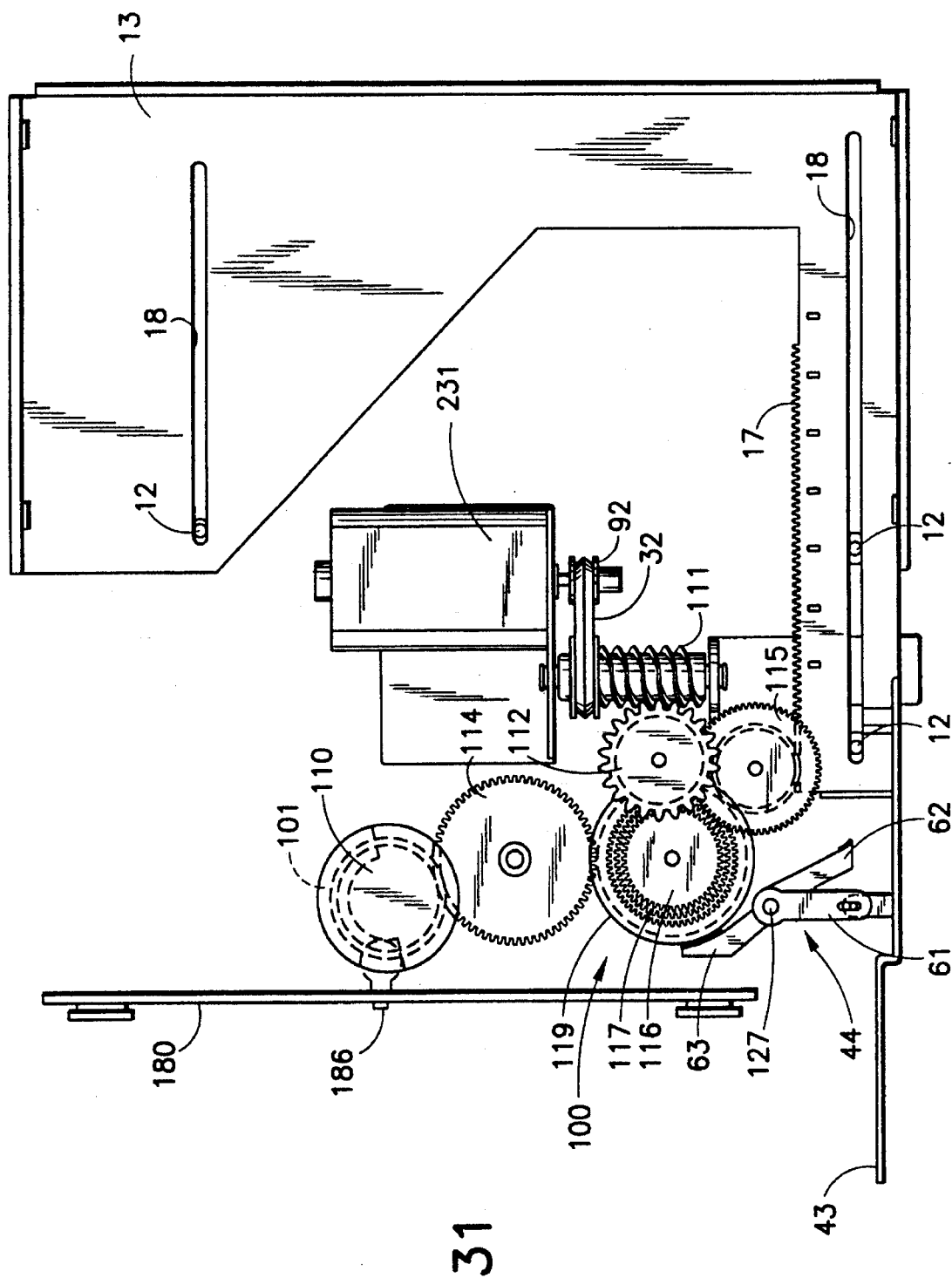
FIG. 31 is a plan view of the vertical transport mechanism of FIG. 16 shown in a magazine transport mode for placing the magazine a bottom position.
Figure 32:
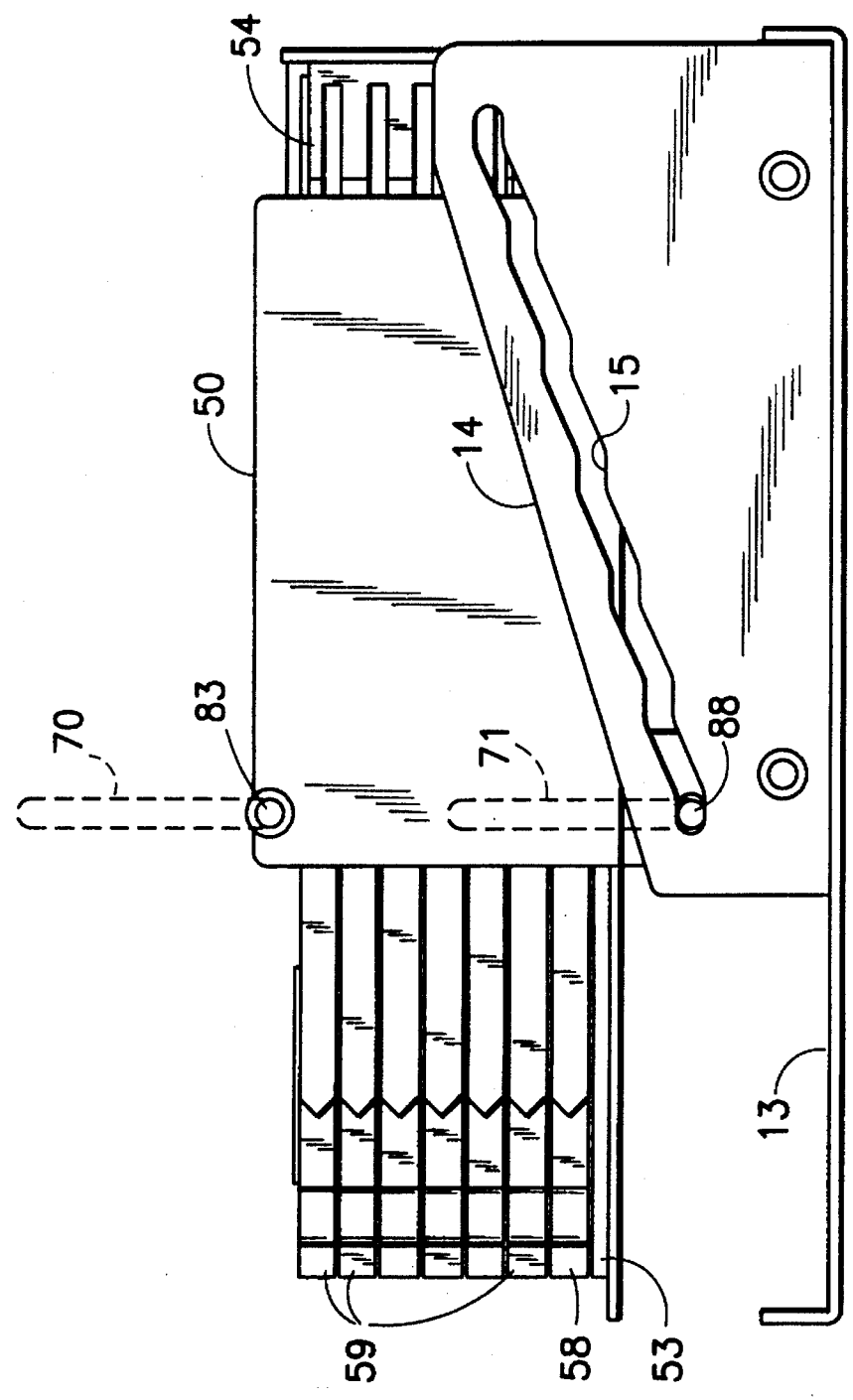
FIG. 32 is a side of the magazine and cam plate assembly showing the magazine in the bottom position.

Referring to FIGS. 31 and 32, the cam plate chassis 13 is shifted to an extreme right which lowers the magazine to select the first disk in a top one of the carriages 59 as shown in FIG. 32. While transport of the magazine 50 is being effected, the cam gear 110 is rotated so that the lifting pin 186 of the support frame of the disk reader assembly 200 is in a lower portion of the cam slot 101 and the disk reader assembly 200 is in a lowered position.

Referring to FIGS. 33–36, the operation of the vertical drive mechanism raising and lowering the disk reader assembly 200 is illustrated.

Figure 33:
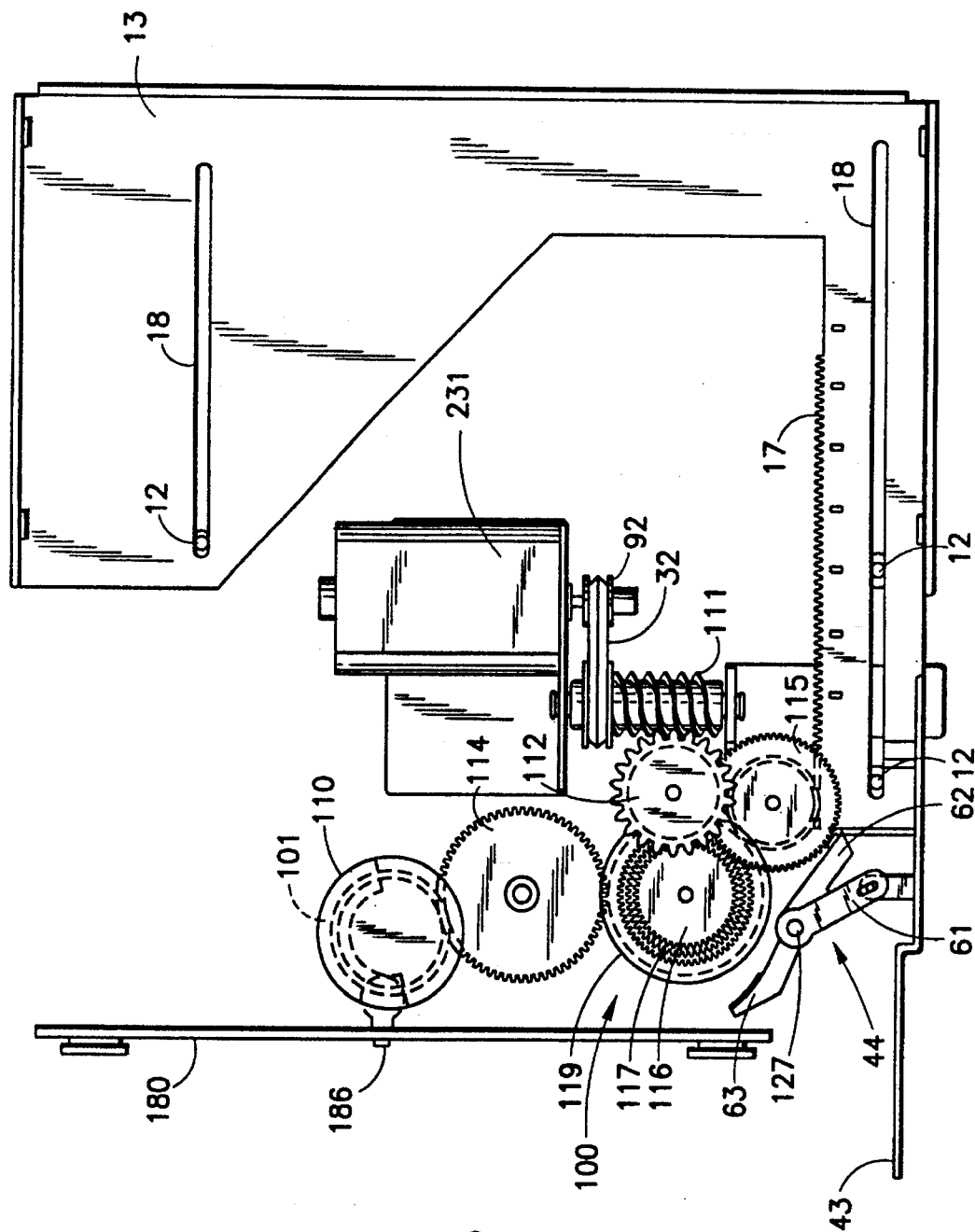
FIG. 33 is a plan view of the vertical transport mechanism of FIG. 16 shown in a disk reader assembly positioning mode with the disk reader assembly in a lowered position.
Figure 34:
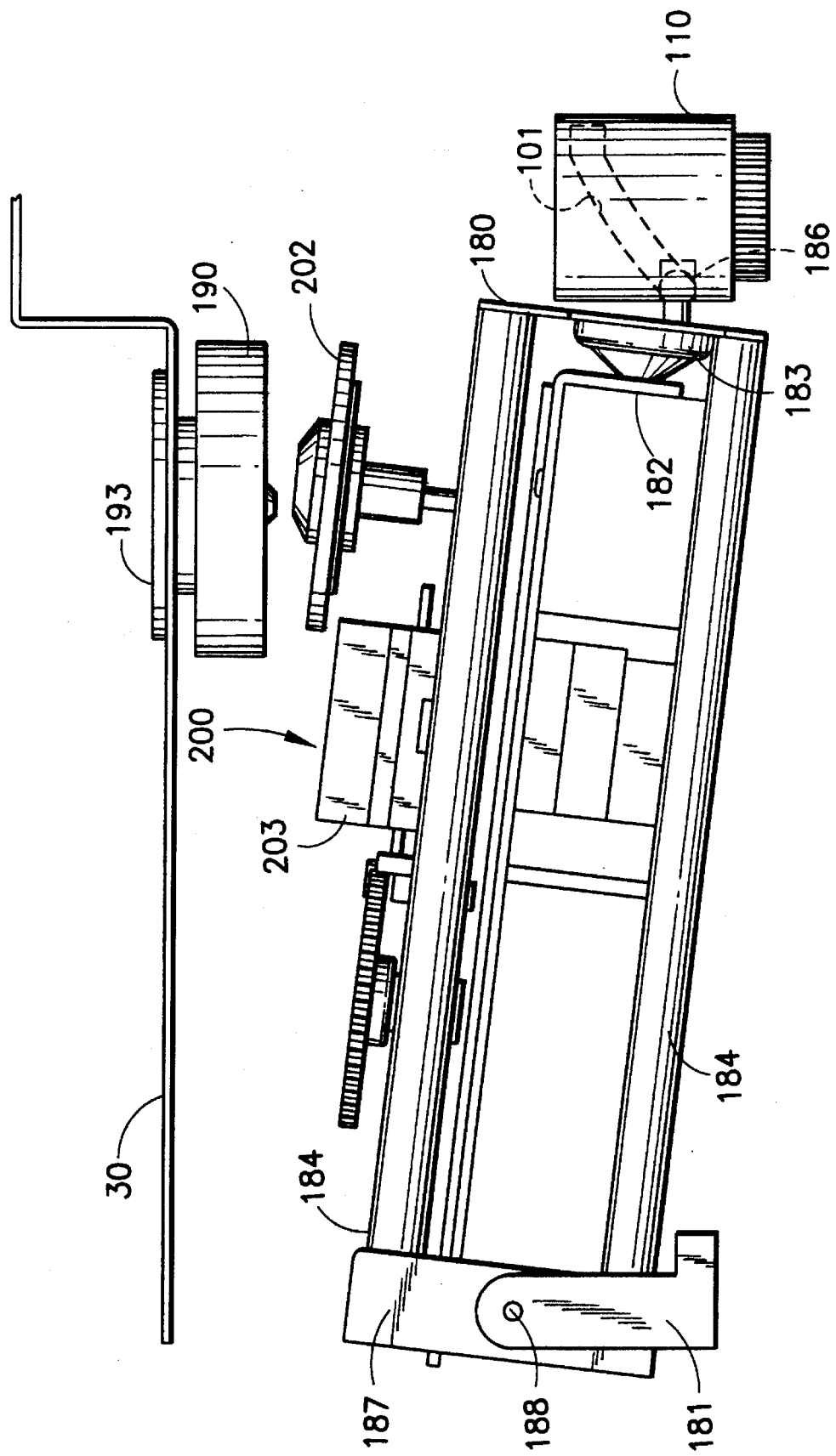
FIG. 34 is side view of the disk reader assembly in the lowered position.

Referring to FIGS. 33 and 34, the lifter plate 43 is moved to a position associated with the eject, load and playback states of operation wherein it provides a clearance between desired ones the carriages, 58 and 59, for the withdrawal or insertion of the selected carriage from or into the magazine 50. In this position, the lifter plate 43 has rotated the shifting member 44 counterclockwise so that the second arm 62 locks the first speed reduction gear 115 coupled to the planetary gear assembly 100. The drive force of the motor 231 is diverted to the second speed reduction gear 114 which drives the cam gear 110.

Referring now to FIGS. 33 and 34, the cam gear 110 is rotated by the motor 231 to a position in which the lifting pin 186 engages a lower portion of the cam slot 101 and the disk reader assembly 200 is in the lower position.

Figure 35:
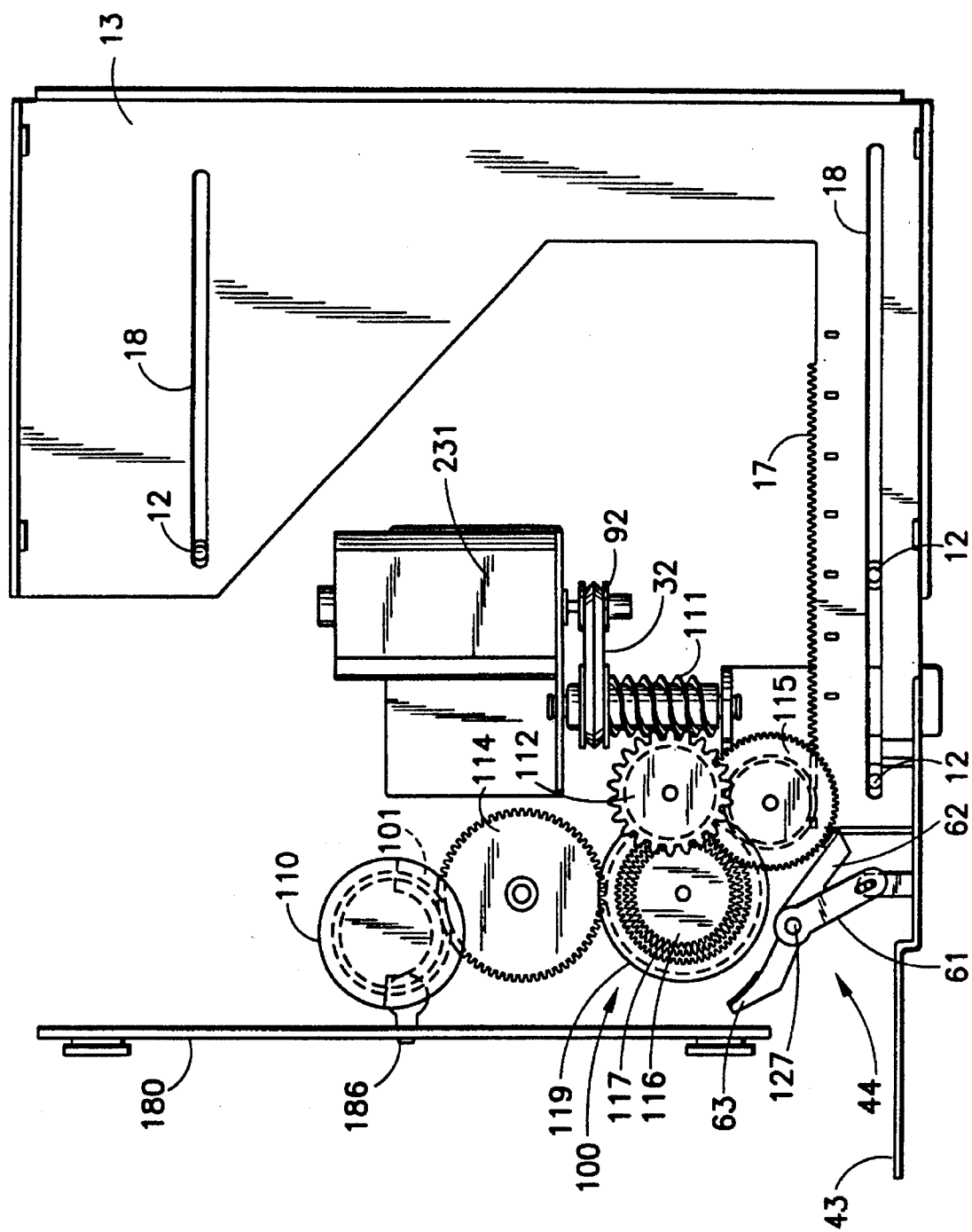
FIG. 35 is a plan view of the vertical transport mechanism of FIG. 16 shown in a disk reader assembly positioning mode with the disk reader assembly in a raised position.
Figure 36:
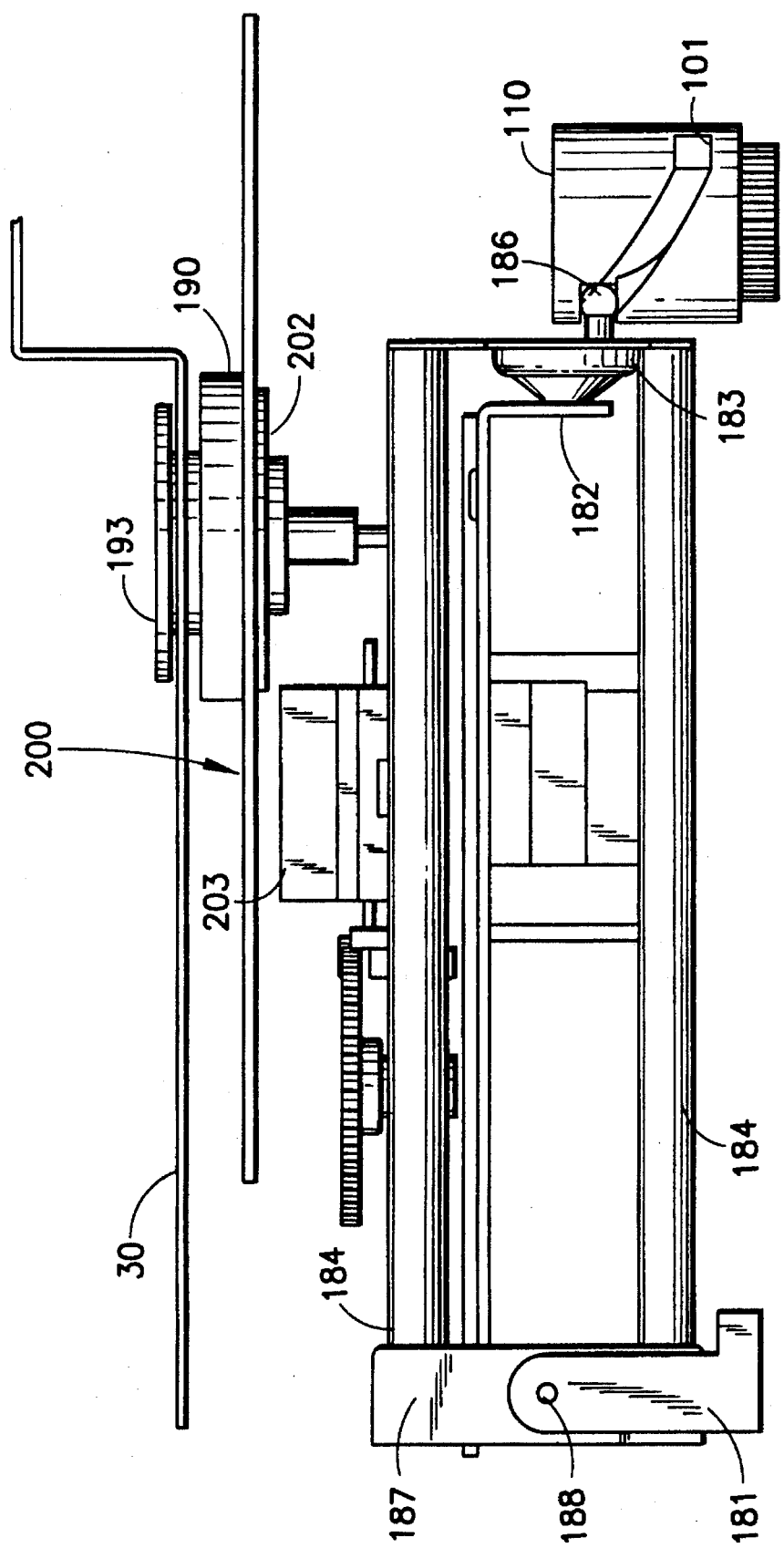
FIG. 36 is a side view of the disk reader assembly in the raised position.

Referring now to FIGS. 35 and 36, the motor 231 drives the cam gear 110 counter-clockwise, while the disk reader assembly 200 is in the playback state, engaging the lifting pin 186 with an upper portion of the cam slot 101. The turntable 202 of the disk reader assembly 200 is thus raised to engage the disk 201 at the playback position.

Alternative embodiments of the present invention can provide for other types of drive switching devices in place of the planetary gear assembly 100. One type of drive switching device includes a pivoting gear meshed with an output of a motor. The pivoting gear is pivoted between two positions at which it is alternatively meshed with an input gear of a mechanism for raising and lowering the disk reader assembly 200 or an input gear of a mechanism for moving the magazine 50. Similarly, a mechanism may be provided for swinging a motor between two positions of engagement with alternative inputs. It is understood that while the instant embodiment employs geared drives, friction drive mechanisms may also be employed. The details of such mechanisms are omitted as they are realizable by those skilled in the art having viewed this disclosure.

Referring to FIG. 39, the disk 201 is lifted free of its carriage, 58 or 59, and pressed into clamping engagement against the clamp assembly 190. The turntable 202 then rotates the disk 201 while the optical pick-up 203 travels from left and right in the figure to read the disk 201. The disk 201 is played while overlapping the remaining disks 201' in the magazine 50. The overlapping arrangement presented is made possible by the clearance provided by the lifter plate 43 as shown in FIG. 37. The selected disk 201 is released from the disk reader assembly 200 by reversing the operation of the motor 231 thereby lowering the disk reader assembly 200. The selected disk 201 then may be stored or ejected as discussed above.

Alternative embodiments of the present invention provide for the lowering of the clamp assembly 190 while the selected disk is displaced downward upon a turntable 202 where the disk reader assembly 200 is fixed in position. Such an embodiment provides for the simultaneous lowering of the selected carriage in a clearance provided by a downward displacement of the disks 201' in a magazine.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk player for playing a selected disk of a plurality of disk, comprising:

a disk reader for reading said selected disk;

a magazine;

a plurality of holding means in said magazine for holding said plurality of disks;

transport means for transporting said selected disk between said disk reader and said magazine;

alignment means for aligning a selected holding means with said transport means;

clamping means for clamping said selected disk on said disk reader permitting said selected disk to be read;

a drive motor;

drive switching means for selectively coupling said drive motor to one of said alignment means and said clamping means;

said drive switching means includes a planetary gear assembly having first and second output gears coupled to said alignment means and said clamping means respectively; and said planetary gear assembly has an input gear coupled to said drive motor.

2. A disk player according to claim 1 wherein:

said drive switching means includes a braking means for selectively braking one of said first and second output gears; and said transport means including means for actuating said braking means.

3. A disk player according to claim 2 wherein said braking means includes a rotatable arm, actuated by said transport means, for braking at least one of said first and second output gears.

4. A disk player for playing a selected disk of a plurality of disks, comprising:

a disk reader for reading said selected disk;

a magazine;

a plurality of holding means in said magazine for holding said plurality of disks;

transport means for transporting said selected disk between said disk reader and said magazine;

alignment means for aligning a selected holding means with said transport means;

clamping means for clamping said selected disk on said disk reader permitting said selected disk to be read;

a drive motor; and drive switching means for selectively coupling said drive motor to one of said alignment means and said clamping means;

said clamping means including means for raising said disk reader to clamp said selected disk for reading;

said means for raising including means for permitting movement of said disk reader between a first position wherein said selected disk is unclamped and a second position wherein said selected disk is clamped;

said disk reader having a follower pin;

a cam member engaging said follower pin; and cam coupling means for coupling an output of said drive switching means to said cam member and moving said cam member to position said disk reader at one of said first and second positions.

5. A disk player according to claim 4 wherein said cam member is a slotted cylinder.

6. A disk player according to claim 4 wherein said means for permitting movement includes a pivot pivotably supporting said disk reader.

7. A disk player capable of playing a selected disk of a plurality of disks comprising:

a chassis;

a disk reader movably mounted in said chassis;

a magazine for accepting said plurality of disks which is movably mounted in said chassis;

transport means for moving said selected disk between said magazine and said disk reader;

aligning means for aligning said magazine with said transport means to permit insertion and withdrawal of said selected disk;

a drive source;

reader moving means for moving said disk reader between a first position disengaged with said selected disk and a second position engaged with said selected disk;

a gear assembly having an input coupled to said drive source, a first output coupled to said aligning means, and a second output coupled to said reader moving means;

a braking member, movably mounted in said chassis, coupled to said transport means, and having first and second brake portions for braking said first and second outputs of said gear assembly; and said braking member being responsive to said transport means to brake said first output of said gear assembly when said transport means is in a first position, and to brake said second output of said gear assembly when said transport means is in a second position.

8. The disk player according to claim 7 wherein:

said gear assembly is a planetary gear assembly;

said planetary gear assembly includes a sun gear;

said planetary gear assembly is rotatably mounted on said chassis;

said input of said planetary gear assembly drives said sun gear;

said planetary gear assembly includes at least one planet gear rotatably mounted on a cage gear and engaging said sun gear;

said cage gear being said first output of the planetary gear assembly;

said planetary gear assembly includes an annulus gear engaging said at least one planet gear; and said annulus gear has a toothed outer perimeter serving as said second output of said planetary gear assembly.

9. The disk player according to claim 7 wherein:

said gear assembly is a planetary gear assembly;

said planetary gear assembly includes a sun gear, a cage gear, and an annulus gear;

said input of said planetary gear assembly is a first one of said sun gear, said cage gear, and said annulus gear;

said first output of said planetary gear assembly is a second one of said sun gear, said cage gear, and said annulus gear; and said second output of said planetary gear assembly is a third one of said sun gear, said cage gear, and said annulus gear.

* * * * *